United States Patent
Cruz-Hernandez et al.

(10) Patent No.: US 9,904,394 B2
(45) Date of Patent: Feb. 27, 2018

(54) METHOD AND DEVICES FOR DISPLAYING GRAPHICAL USER INTERFACES BASED ON USER CONTACT

(71) Applicant: Immersion Corporation, San Jose, CA (US)

(72) Inventors: Juan Manuel Cruz-Hernandez, Montreal (CA); Ali Modarres, Montreal (CA)

(73) Assignee: IMMERSON CORPORATION, San Jose, CA (US)

( * ) Notice: Subject to any disclaimer, the term of this patent is extended or adjusted under 35 U.S.C. 154(b) by 53 days.

(21) Appl. No.: 13/800,264

(22) Filed: Mar. 13, 2013

(65) Prior Publication Data

US 2014/0282051 A1 Sep. 18, 2014

(51) Int. Cl.
| | | |
|---|---|---|
| *G06F 3/0487* | (2013.01) | |
| *G06F 3/041* | (2006.01) | |
| *G06F 3/0488* | (2013.01) | |
| *G06F 1/16* | (2006.01) | |
| *G06F 3/01* | (2006.01) | |

(52) U.S. Cl.
CPC ............ *G06F 3/0414* (2013.01); *G06F 1/169* (2013.01); *G06F 3/016* (2013.01); *G06F 3/0488* (2013.01)

(58) Field of Classification Search
CPC .. G06F 3/0482; G06F 3/04842; G06F 19/322; G06F 19/325
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagen |

(Continued)

FOREIGN PATENT DOCUMENTS

| | | |
|---|---|---|
| CN | 101714055 | 5/2010 |
| CN | 102937873 | 9/2015 |

(Continued)

OTHER PUBLICATIONS

European Patent Office, Extended Search Report, Application No. 14158395, dated Sep. 1, 2014.

(Continued)

*Primary Examiner* — William Bashore
*Assistant Examiner* — Rayeez Chowdhury
(74) *Attorney, Agent, or Firm* — Kilpatrick Townsend & Stockton LLP

(57) ABSTRACT

Method and devices for displaying graphical user interface configurations based detected user contact are disclosed. One disclosed method comprises displaying a graphical user interface (GUI) according to a first GUI configuration on a display of a handheld device, receiving a sensor signal from a sensor, the sensor coupled to the handheld device, the sensor signal indicating a contact with the handheld device, determining a grasping contact based at least in part on the sensor signal, determining a second GUI configuration based at least in part on the grasping contact, and displaying the GUI on the display according to the second GUI configuration.

23 Claims, 18 Drawing Sheets

(56) References Cited

U.S. PATENT DOCUMENTS

| | | |
|---|---|---|
| 3,838,397 A | 9/1974 | Watson et al. |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Salsbury |
| 4,236,325 A | 12/1980 | Hall et al. |
| 4,262,549 A | 4/1981 | Schwellenbach |
| 4,311,980 A | 1/1982 | Prudenziati |
| 4,333,070 A | 6/1982 | Barnes |
| 4,362,408 A | 12/1982 | Cordes et al. |
| 4,464,117 A | 8/1984 | Forest |
| 4,484,191 A | 11/1984 | Vavra |
| 4,513,235 A | 4/1985 | Acklam et al. |
| 4,581,491 A | 4/1986 | Boothroyd |
| 4,581,972 A | 4/1986 | Hoshino |
| 4,599,070 A | 7/1986 | Hladky et al. |
| 4,692,756 A | 9/1987 | Clark |
| 4,708,656 A | 11/1987 | De Vries et al. |
| 4,713,007 A | 12/1987 | Alban |
| 4,725,817 A | 2/1988 | Jay |
| 4,791,416 A | 12/1988 | Adler |
| 4,794,392 A | 12/1988 | Selinko |
| 4,795,296 A | 1/1989 | Wijlborg |
| 4,798,919 A | 1/1989 | Suita |
| 4,821,030 A | 4/1989 | Batson |
| 4,823,106 A | 4/1989 | Pope |
| 4,840,634 A | 6/1989 | Muller |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,982,918 A | 1/1991 | Kaye |
| 4,983,786 A | 1/1991 | Stevens |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,053,585 A | 10/1991 | Yaniger |
| 5,078,152 A | 1/1992 | Bond |
| 5,116,051 A | 5/1992 | Moncrief |
| 5,165,897 A | 11/1992 | Johnson |
| 5,175,459 A | 12/1992 | Daniel et al. |
| 5,182,557 A | 1/1993 | Lang |
| 5,186,685 A | 2/1993 | Grossman et al. |
| 5,212,473 A | 5/1993 | Louis |
| 5,223,658 A | 6/1993 | Suzuki |
| 5,237,327 A | 8/1993 | Saitoh |
| 5,240,417 A | 8/1993 | Smithson et al. |
| 5,241,308 A | 8/1993 | Young |
| 5,246,316 A | 9/1993 | Smith |
| 5,271,290 A | 12/1993 | Fischer |
| 5,275,174 A | 1/1994 | Cook |
| 5,283,970 A | 2/1994 | Aigner |
| 5,289,273 A | 2/1994 | Lang |
| 5,299,810 A | 4/1994 | Pierce et al. |
| 5,309,140 A | 5/1994 | Everett |
| 5,334,027 A | 8/1994 | Wherlock |
| 5,355,148 A | 10/1994 | Anderson |
| 5,390,128 A | 2/1995 | Ryan |
| 5,390,296 A | 2/1995 | Crandall |
| 5,402,499 A | 3/1995 | Robinson |
| 5,402,680 A | 4/1995 | Korenaga |
| 5,436,622 A | 7/1995 | Gutman et al. |
| 5,437,607 A | 8/1995 | Taylor |
| 5,451,924 A | 9/1995 | Massimino |
| 5,461,711 A | 10/1995 | Wang |
| 5,466,213 A | 11/1995 | Hogan et al. |
| 5,489,812 A | 2/1996 | Furuhata |
| 5,496,174 A | 3/1996 | Garner |
| 5,514,150 A | 5/1996 | Rostoker |
| 5,521,336 A | 5/1996 | Buchanan |
| 5,547,382 A | 8/1996 | Yamasaki et al. |
| 5,575,761 A | 11/1996 | Hajianpour |
| 5,631,861 A | 5/1997 | Kramer |
| 5,684,722 A | 11/1997 | Thorner |
| 5,691,747 A | 11/1997 | Amano |
| 5,709,219 A | 1/1998 | Chen |
| 5,729,249 A | 3/1998 | Yasutake |
| 5,766,016 A | 6/1998 | Sinclair et al. |
| 5,767,457 A | 6/1998 | Gerpheide |
| 5,785,630 A | 7/1998 | Bobick et al. |
| 5,791,992 A | 8/1998 | Crump |
| 5,844,392 A | 12/1998 | Peurach |
| 5,857,986 A | 1/1999 | Moriyasu |
| 5,887,995 A | 3/1999 | Holehan |
| 5,889,670 A | 3/1999 | Schuler |
| 5,889,672 A | 3/1999 | Schuler |
| 5,917,906 A | 6/1999 | Thornton |
| 5,943,044 A * | 8/1999 | Martinelli ............ G06F 3/03547 178/18.01 |
| 5,945,772 A | 8/1999 | Macnak |
| 5,977,867 A | 11/1999 | Bouin |
| 5,988,902 A | 11/1999 | Holehan |
| 6,059,506 A | 5/2000 | Kramer |
| 6,078,126 A | 6/2000 | Rollins |
| 6,097,964 A | 8/2000 | Nuovo |
| 6,111,577 A | 8/2000 | Zilles et al. |
| 6,118,435 A | 9/2000 | Fujita et al. |
| 6,131,097 A | 10/2000 | Peurah |
| 6,160,489 A | 12/2000 | Perry et al. |
| 6,195,592 B1 | 2/2001 | Schuler |
| 6,198,206 B1 | 3/2001 | Saarmaa |
| 6,218,966 B1 | 4/2001 | Goodwin |
| 6,219,034 B1 | 4/2001 | Elbing et al. |
| 6,225,976 B1 | 5/2001 | Yates |
| 6,292,173 B1 | 9/2001 | Rambaldi et al. |
| 6,307,465 B1 | 10/2001 | Kayma et al. |
| 6,344,791 B1 | 2/2002 | Armstrong |
| 6,369,803 B2 | 4/2002 | Brisebois et al. |
| 6,373,463 B1 | 4/2002 | Beeks |
| 6,374,255 B1 | 4/2002 | Peurah |
| 6,388,655 B1 | 5/2002 | Leung |
| 6,422,941 B1 | 7/2002 | Thorner et al. |
| 6,429,846 B2 | 8/2002 | Rosenberg |
| 6,543,487 B2 | 5/2003 | Bazinet |
| 6,597,347 B1 | 7/2003 | Yasutake |
| 6,597,384 B1 * | 7/2003 | Harrison ............... G06F 1/1626 345/169 |
| 6,657,617 B2 | 12/2003 | Paolini et al. |
| 6,735,307 B1 | 5/2004 | Volckers |
| 6,781,569 B1 | 8/2004 | Gregorio et al. |
| 6,801,191 B2 | 10/2004 | Mukai et al. |
| 6,976,562 B1 | 12/2005 | Perret, Jr. et al. |
| 7,202,851 B2 | 4/2007 | Cunningham et al. |
| 8,564,544 B2 | 10/2013 | Jobs et al. |
| 8,599,152 B1 * | 12/2013 | Wurtenberger ..... G06F 3/04895 345/168 |
| 9,335,925 B2 | 5/2016 | Huh et al. |
| 2002/0033795 A1 * | 3/2002 | Shahoian ............... G06F 1/1616 345/156 |
| 2002/0128048 A1 | 9/2002 | Aaltonen |
| 2002/0149561 A1 | 10/2002 | Fukumoto et al. |
| 2002/0171621 A1 | 11/2002 | Johnson |
| 2002/0177471 A1 | 11/2002 | Kaaresoja |
| 2005/0099393 A1 | 5/2005 | Johnson |
| 2005/0145100 A1 * | 7/2005 | Ramstein ................ G10H 1/32 84/645 |
| 2006/0038774 A1 * | 2/2006 | Mese ..................... G06F 1/1616 345/156 |
| 2006/0066569 A1 | 3/2006 | Tryder |
| 2006/0254888 A1 * | 11/2006 | Okada ................. G07F 17/3211 200/6 A |
| 2007/0018959 A1 | 1/2007 | Kwon |
| 2007/0236474 A1 * | 10/2007 | Ramstein ................ G06F 3/016 345/173 |
| 2008/0068350 A1 | 3/2008 | Rosenberg et al. |
| 2009/0002178 A1 * | 1/2009 | Guday ................. A61B 5/0002 340/573.1 |
| 2009/0160792 A1 | 6/2009 | Morohoshi et al. |
| 2009/0280860 A1 * | 11/2009 | Dahlke ................... G06F 3/016 455/556.1 |

(56) References Cited

U.S. PATENT DOCUMENTS

| | | | |
|---|---|---|---|
| 2010/0085317 A1* | 4/2010 | Park | G06F 1/1626 345/173 |
| 2010/0088639 A1* | 4/2010 | Yach | G06F 1/1626 715/825 |
| 2010/0123588 A1* | 5/2010 | Cruz Hernandez | A61B 5/02438 340/573.1 |
| 2011/0007021 A1 | 1/2011 | Bernstein et al. | |
| 2012/0028577 A1 | 2/2012 | Rodriguez | |
| 2012/0038470 A1* | 2/2012 | Kim | H04N 1/00411 340/407.2 |
| 2012/0218732 A1* | 8/2012 | Minemura | G06F 1/1681 361/810 |
| 2012/0223880 A1* | 9/2012 | Birnbaum | G06F 3/015 345/156 |
| 2012/0232780 A1 | 9/2012 | Delson | |
| 2013/0002565 A1 | 1/2013 | Tumanov et al. | |
| 2013/0229396 A1* | 9/2013 | Huebner | H04N 9/3147 345/207 |
| 2013/0234948 A1* | 9/2013 | Jian | G06F 3/0487 345/169 |
| 2013/0285963 A1* | 10/2013 | Park | G06F 1/1626 345/173 |
| 2014/0098028 A1 | 4/2014 | Kwak et al. | |

FOREIGN PATENT DOCUMENTS

| | | |
|---|---|---|
| EP | 0349086 | 1/1990 |
| EP | 0817110 | 1/1998 |
| EP | 1965291 | 9/2008 |
| EP | 2175344 | 4/2010 |
| EP | 2194444 | 6/2010 |
| GB | 2180342 | 3/1987 |
| JP | 01-003664 | 7/1990 |
| JP | H2-185278 | 7/1990 |
| JP | 02-109714 | 1/1992 |
| JP | H4-8381 | 1/1992 |
| JP | 04-007371 | 8/1993 |
| JP | H5-192449 | 8/1993 |
| JP | 05-193862 | 1/1995 |
| JP | H7-24147 | 1/1995 |
| JP | 8221173 | 8/1996 |
| JP | 10171586 | 6/1998 |
| JP | 11024834 | 1/1999 |
| JP | 11085400 | 3/1999 |
| JP | 2001-222379 | 8/2001 |
| JP | 2001-265485 | 9/2001 |
| JP | 2001-290572 | 10/2001 |
| JP | 2001-296950 | 10/2001 |
| JP | 2001-350592 | 12/2001 |
| JP | 2002-259059 | 9/2002 |
| KR | 2001-0028369 | 4/2001 |
| WO | WO 95/20787 | 8/1995 |
| WO | WO 97/18546 | 5/1997 |
| WO | WO 99/49443 | 9/1999 |
| WO | WO 01/54109 | 7/2001 |
| WO | WO 02/27645 | 4/2002 |
| WO | WO 02/31807 | 4/2002 |
| WO | WO 02/19110 | 11/2002 |
| WO | 2005/071438 A1 | 8/2005 |

OTHER PUBLICATIONS

European Patent Application No. 14 158 395.5, Office Action dated Sep. 24, 2015.
European Patent Office, Communication Pursuant to Article 94(3) EPC, Application No. 14158395 dated Jul. 9, 2016.
Adelstein, "A Virtual Environment System For The Study of Human Arm Tremor," Ph.D. Dissertation, Dept. of Mechanical Engineering, MIT, Jun. 1989.
Adelstein, "Design and Implementation of a Force Reflecting Manipulandum for Manual Control research," DSC-vol. 42, Advances in Robotics, Edited by H. Kazerooni, pp. 1-12, 1992.
Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings Of Fourth CISM-IFToMM, Sep. 8-12, 1981.
Bejczy, et al., "Universal Computer Control System (UCCS) For Space Telerobots," CH2413-3/87/0000/0318501.00 1987 IEEE, 1987.
Bejczy et al., "A Laboratory Breadboard System For Dual-Arm Teleoperation," SOAR '89 Workshop, JSC, Houston, TX, Jul. 25-27, 1989.
Bliss, "Optical-to-Tactile Image Conversion for the Blind," IEEE Transactions on Man-Machine Systems, vol. MMS-11, No. 1, Mar. 1970.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Cadler, "Design of a Force-Feedback Touch-Introducing Actuator For Teleoperator Robot Control," Bachelor of Science Thesis, MIT, Jun. 23, 1983.
Caldwell et al., "Enhanced Tactile Feedback (Tele-Traction) Using a Multi-Functional Sensory System," 1050-4729/93, pp. 955-960, 1993.
Eberhardt et al., "OMAR—A Haptic display for speech perception by deaf and def-blind individuals," IEEE Virtual Reality Annual International Symposium, Seattle, WA, Sep. 18-22, 1993.
Eberhardt et al., "Inducing Dynamic Haptic Perception by The Hand: System Description and Some Results," DSC-vol. 55-1, Dynamic Systems and Control: vol. 1, ASME 1994.
Fukumoto, "Active Click: Tactile Feedback For Touch Panels," ACM CHI2001 Extended Abstracts, pp. 121-122, Apr. 2001.
Gobel et al., "Tactile Feedback Applied to Computer Mice," International Journal of Human-Computer Interaction, vol. 7, No. 1, pp. 1-24, 1995.
Gotow et al, "Controlled Impedance Test Apparatus for Studying Human Interpretation of Kinesthetic Feedback," WA11-11:00, pp. 332-337.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bullein, "Mouse Ball-Actuating Device With Force and Tactile Feedback," vol. 32, No. 9B, Feb. 1990.
Iwata, "Pen-based Haptic Virtual Environment," 0-7803-1363-1/93 IEEE, pp. 287-292, 1993.
Jacobsen et al., "High Performance, Dextrous Telerobotic Manipulator With Force Reflection," Intervention/ROV '91 Conference & Exposition, Hollywood, Florida, May 21-23, 1991.
Johnson, "Shape-Memory Alloy Tactile Feedback Actuator," Armstrong Aerospace Medical Research Laboratory, AAMRL-TR-90-039, Aug. 1990.
Jones et al., "A perceptual analysis of stiffness," ISSN 0014-4819 Springer International (Springer-Vertag); Experimental Brain Research, vol. 79, No. 1, pp. 150-156, 1990.
Kaczmarek et al., "Tactile Displays," Virtual Environment Technologies.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Kontarinis et al., "Tactile Display of Vibratory Information in Teleoperation and Virtual Environments," Presence, 4(4):387-402, 1995.
Lake, "Cyberman from Logitech," GameBytes, 1994.

(56) References Cited

OTHER PUBLICATIONS

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Textue for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," 2nd Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Accoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride", Computer Currents, Nov. 1994, Boston Edition, vol. 9 No. 11.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

SMK Corporation, "Force Feedback Type Optical Touch Panel Developed," SMK Corporation Website, Oct. 30, 2002.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSV-vol. 42, Advances in Robotics, pp. 55-61, ASME 1992.

Tadros, "Control System Design for a Three Degree of Freedom Virtual Environment Simulator Using Motor/Brake Pair Actuators," MIT Archive© Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

Wakiwaka, et al., "Influence of Mover Support Structure on Linear Oscillatory Actuator for Cellular Phones," The Third International Symposium on Linear Drives for Industry Applications, 2001, p. 260-263, Nagano, Japan.

Wiker, "Teletouch Display Development: Phase 1 Report," Technical Report 1230, Naval Ocean Systems Center, San Diego, Apr. 17, 1989.

Miller, P., Synaptics Fuse Concept Hands-On, Engadget, web page at http://www.engadget.com/2010/01/09/snaptics-fuse-concept-hands-on/ as available via the Internet and printed Sep. 16, 2013.

Heo, S. et al., Force Gestures: Augmented Touch Screen ,Gestures using Normal and Tangential Force, CHI EA '11, Extended Abstracts on Human Factors in Computing Systems, 2011, pp. 1909-1914.

Chang, A. et al., ComTouch: Design of a Vibrotactile Communication Device, Proceeding—DIS '02 Proceedings of the 4th conference on Designing interactive systems: processes, practices, methods, and techniques, 2002, pp. 312-320.

Synaptics Demos Fuse Concept Phone Prototype, uploaded on Mar. 9, 2010 by chuongvision, web page at http://www.youtube.com/watch?v=I2TYPge8CtU.

PocketTouch: Through-Fabric Capacitive Touch Input, Microsoft Research, recorded Oct. 14, 2011, web page at http://research.microsoft.com/apps/video/default.aspx?id=155018.

European Patent Office Application No. 14158395.5, Summons to Attend Oral Proceedings dated Mar. 10, 2017.

European Patent Office Application No. 16200104.4, Extended European Search Report dated Feb. 22, 2017.

Puerto, Mildred J. et al., "Influence of User Grasping Position on Haptic Rendering", IEEE I ASME Transactions On Mechatronics, IEEE Service Center, Piscataway, NJ, US, vol. 17, No. 1, Feb. 1, 2012, pp. 174-182.

Chinese Patent Application No. CN 201410093611.5, Office Action dated May 22, 2017.

European Patent Office, Decision to refuse a European Patent Application, European Application No. 14158395.5, dated Dec. 11, 2017, 14 pages.

European Patent Office, Minutes of Oral Proceedings, European Application No. 14158395.5, dated Dec. 4, 2017, 24 pages.

\* cited by examiner

METHOD AND DEVICES FOR DISPLAYING GRAPHICAL USER INTERFACES BASED ON USER CONTACT

FIELD

The present disclosure generally relates to methods and devices for displaying graphical user interfaces, and more particularly to methods and devices for displaying graphical user interface configurations based user contact.

BACKGROUND

Presently, handheld devices are used to perform a myriad of tasks ranging from conducting phone calls and sending text messages to recording video, snapping pictures, and browsing the Internet. When using a handheld device, especially handheld devices comprising touch screens, a typical user often holds or grasps the handheld device in a variety of different ways depending on any number of factors (e.g. task being performed, hand availability, comfort, preference, etc.). For example, when composing a text message or an email, users often turn the device to a horizontal or landscape orientation and hold the device with two hands in order to use both thumbs to compose the message. However, when users only have a single available hand (e.g. standing and holding a cup of coffee in one hand), users often opt to hold the handheld device in a vertical or portrait orientation and compose the message with one thumb. To accommodate this behavior, current handheld devices rotate the display and in some cases modify the user interface based on whether the handheld device is in a vertical or horizontal position. While useful, adjusting the user interface based only on vertical or horizontal orientation is a crude tool that does not take into account whether a user is holding the device with one hand versus two hands or the type of one-handed or two-handed grasp that a user is employing. Consequently, present devices do not adjust the configuration of the user interface for the variety of holds or grasps that a user may employ while the handheld device is vertically oriented or the variety of holds or grasps that a user may employ when the handheld device is horizontally oriented.

SUMMARY

The present disclosure generally relates to a method comprising displaying a graphical user interface (GUI) according to a first GUI configuration on a display of a handheld device, receiving a sensor signal from a sensor the sensor coupled to the handheld device and the sensor signal indicating a contact with the handheld device determining a grasping contact based at least in part on the sensor signal, determining a second GUI configuration based at least in part on the grasping contact, and displaying the GUI on the display according to the second GUI configuration. Another embodiment comprises a computer-readable medium encoded with processor-executable software program code for carrying out such a method.

Illustrative embodiments disclosed herein are mentioned not to limit or define the invention, but to provide examples to aid understanding thereof. Illustrative embodiments are discussed in the Detailed Description and further description of the invention is provided therein. Advantages offered by various embodiments of this invention may be further understood by examining this specification.

BRIEF DESCRIPTION OF THE DRAWINGS

These and other features, aspects, and advantages according to the present disclosure are better understood when the following Detailed Description is read with reference to the accompanying figures, wherein.

DETAILED DESCRIPTION

Embodiments according to this disclosure provide methods and handheld devices for displaying graphical GUI configurations based on user contact. In particular, various graphical GUI configurations are displayed based on how a user is grasping or holding a handheld device.

Illustrative Embodiment

In one illustrative embodiment, a touchscreen cell phone comprises two pressure sensors configured to detect and measure pressure applied to the sides of the cell phone. The handheld device processes the pressure measurements to determine how the user is grasping or holding the cell phone.

In one particular example, the cell phone is displaying an interactive snap application and then determines that is the user has changed his grip such that he is holding the cell phone in a vertical orientation in his right hand. In response, the cell phone configures the GUI of the interactive map application displayed on the cell phone so that interface controls are located on the right side of the display. When holding a cell phone vertically in his right hand, the user's right thumb is generally freely movable and may be the most convenient digit for interacting with the GUI of the interactive map application. By configuring the GUI of the interactive map application to place interface controls near the user's right thumb, the cell phone maximizes the usability of the GUI.

Figure 11:
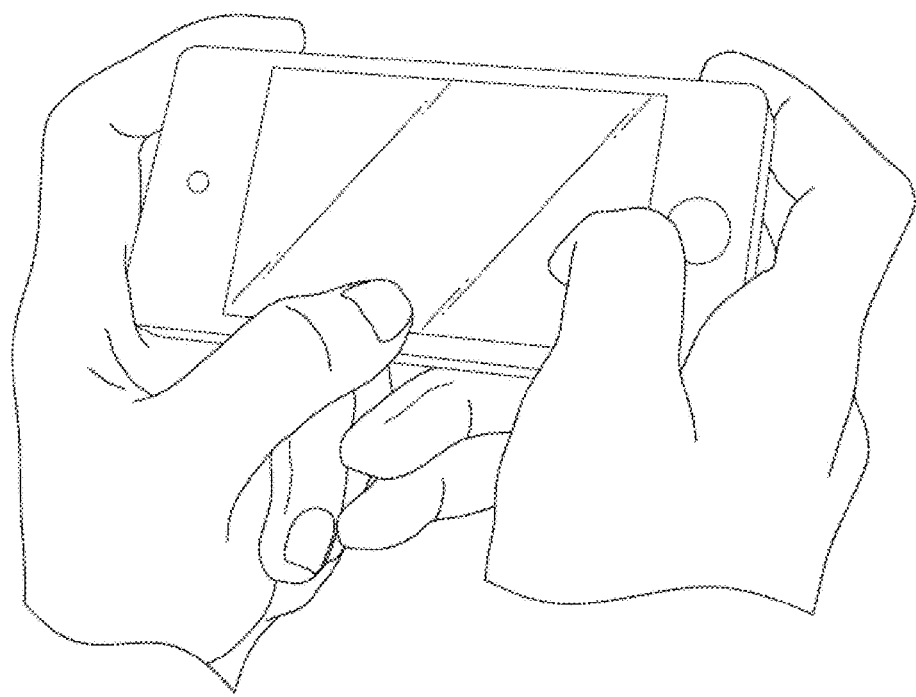

As the user continues to modify his grasp of his cell phone, the cell phone determines each new grasp applied to the cell phone and displays GUIs based on the various grasps. For example, the user may adjust his grasp of the cell phone such that he is holding the cell phone in a horizontal orientation with his left hand grasping the left side of the cell phone and his right hand grasping the right side of the cell phone. In response, the cell phone configures the GUI for interactive map application such that the interface controls are located on the left and right sides of the display close to the user's thumbs. When holding a cell phone in this manner, a user's thumbs are typically unencumbered and are the most convenient fingers for interacting with the GUI, as shown in FIG. 11. Once again, by modifying the GUI based on the user's grasp, the cell phone configures the GUI of the interactive map application to maximize the usability of the cell phone.

Illustrative Device

Figure 1:
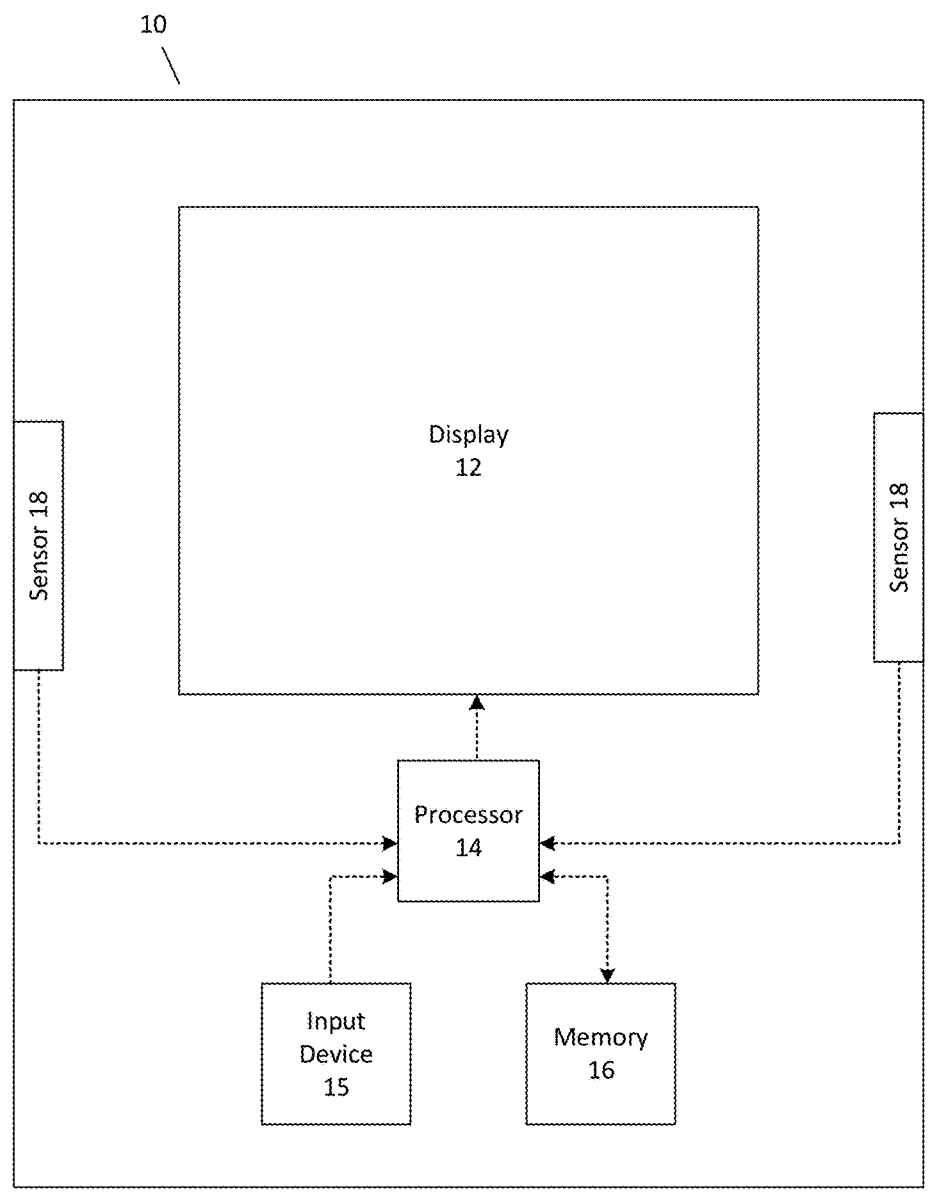
FIGS. 1-4 are illustrations of a handheld device according to embodiments.

Referring now to FIG. 1, a block diagram illustrating a handheld device according to one embodiment of the disclosure is shown. Handheld device 10 comprises a processor 14. Handheld device 10 also comprises a memory 16, a display 12, an input device 15, and sensors 18, all in communication with the processor 14. In one embodiment, the handheld device 10 is a cell phone. In other embodiments, handheld device 10 may be an MP3 player, a digital camera, a handheld video gaming device, a tablet computer, or any other handheld device comprising a display.

In some embodiments, the handheld device 10 comprises a touch screen that acts as both a display 12 and an input device 15. In other embodiments, input devices 15 may include one or more buttons, trackballs, scroll wheels, touchpads, and/or any other input device known to one having ordinary skill in the art. In some embodiments, handheld device 10 further comprises a communication component for communicating with a network and/or with another device. For example, the communication component may be a wireless networking device, a module and antenna for communication with a cellular network, or a module and antenna for direct communication with another device. Handheld device 10 also comprises memory 16 which stores software program code that is executable by processor 14. For example, memory 16 may comprise random-access memory that stores program code for an operating system and user applications. For example, memory 16 may comprise user applications including a map application, an email application, a messaging application, a camera application, an internet browser application, a music application, a calendar application, or any other application.

Figure 2:
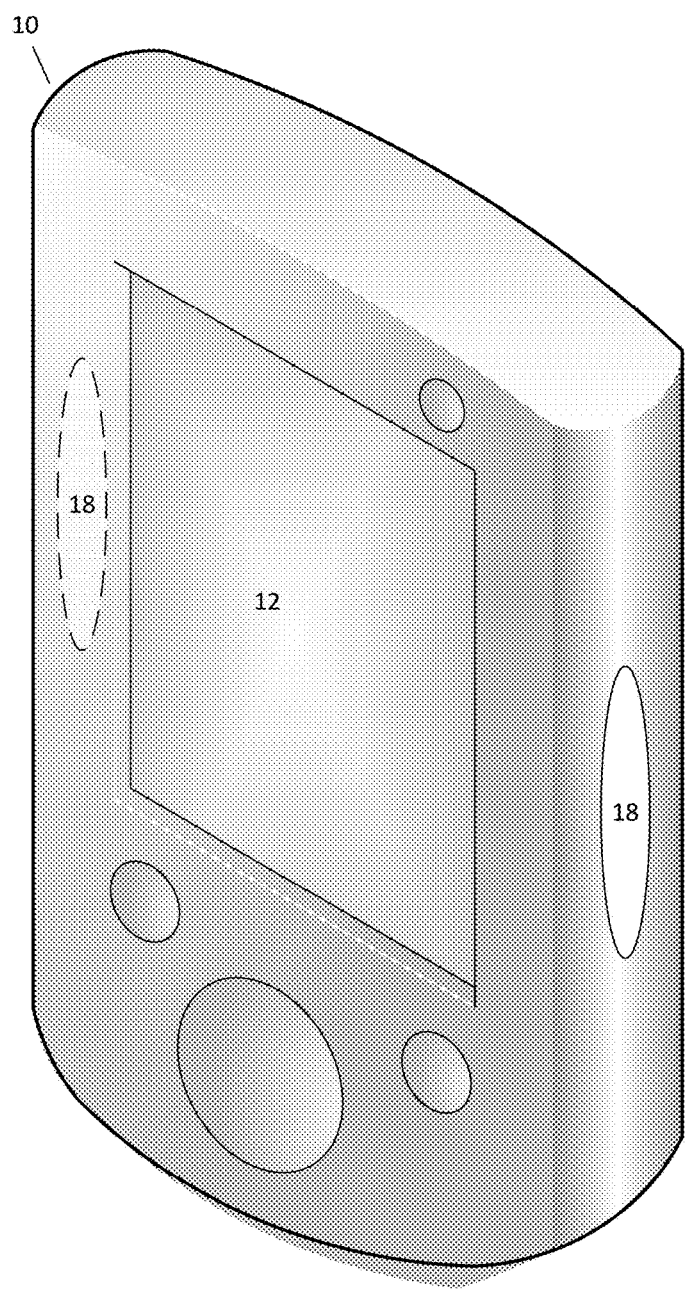
Figure 3:
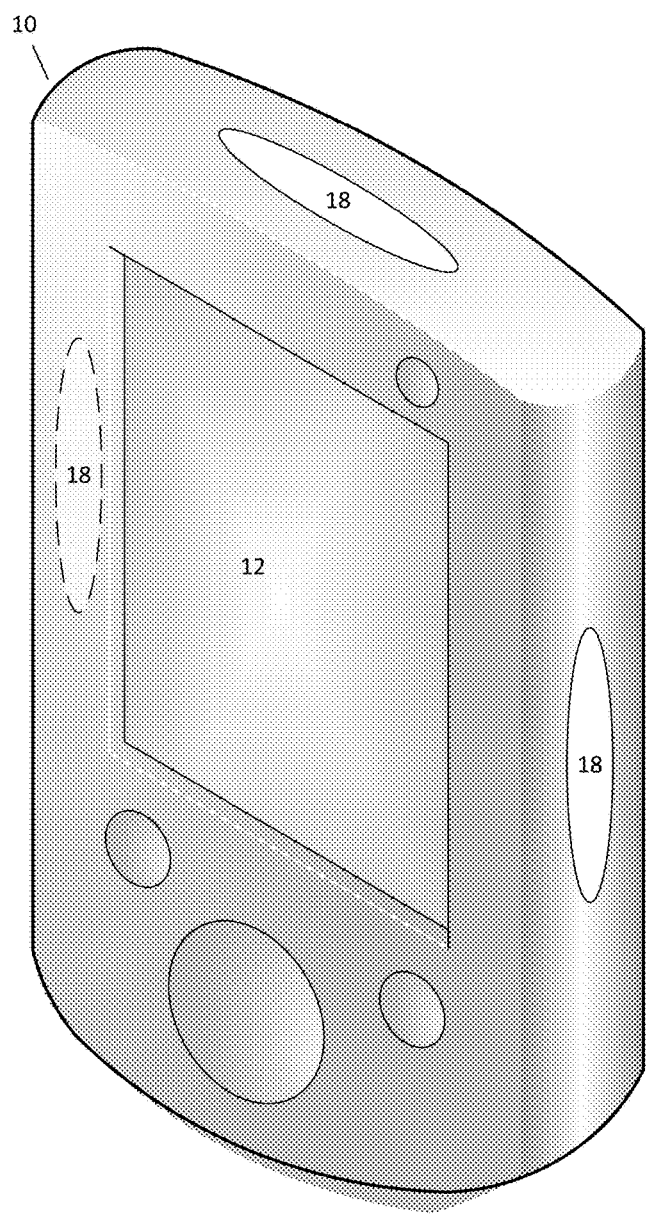
Figure 4:
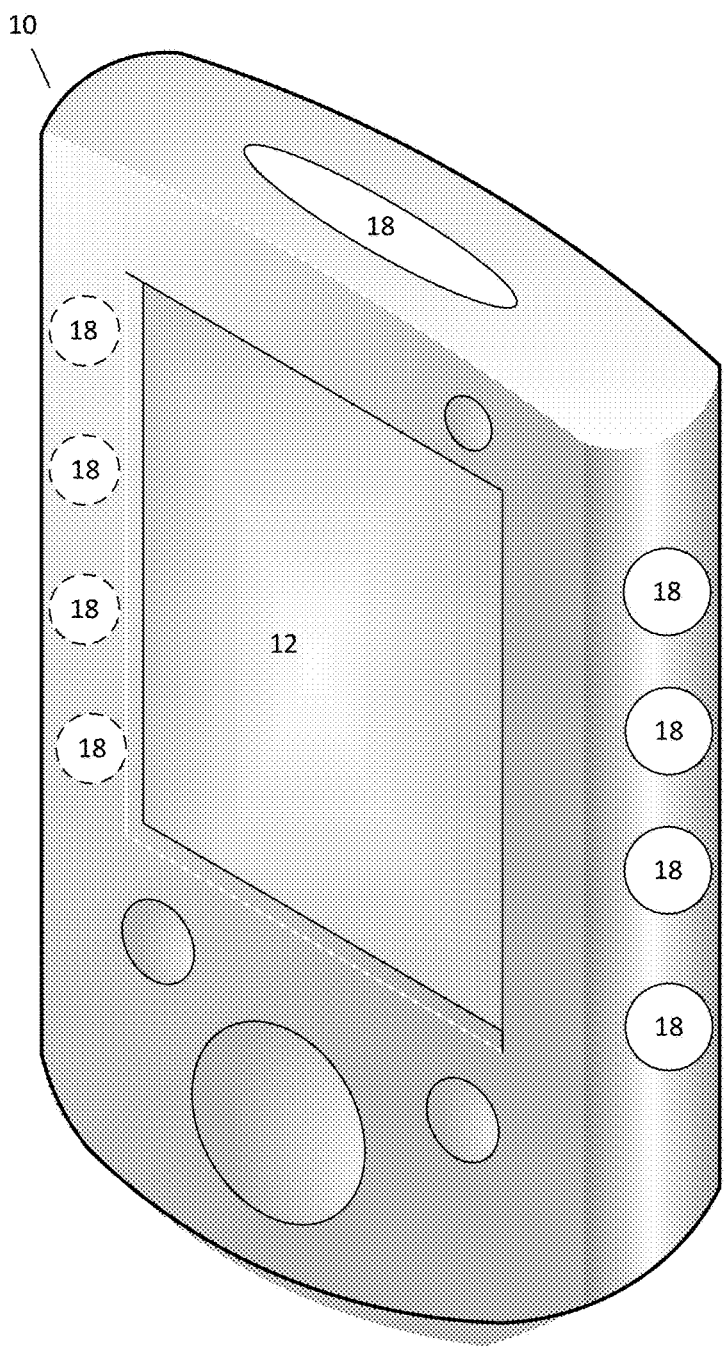

The presence of two boxes labeled as "Sensor 18" in the block diagram of FIG. 1 is not intended to limit a particular embodiment according to the present disclosure to a particular number of sensors. Rather, it is intended to demonstrate that various embodiments according to the present disclosure may comprise one sensor, two sensors, or any number of sensors. For example, FIG. 2 illustrates a handheld device 10 according to one embodiment according to the present disclosure comprising two sensors 18, one located at each side of the handheld device 10. FIG. 3 illustrates a handheld device 10 according to one embodiment according to the present disclosure comprising two sensors 18, one located at each side of the handheld device 10, and an additional sensor 18 located at the top of the handheld device 10. In still another embodiment, illustrated by FIG. 4, a handheld device 10 comprises nine sensors 18: four sensors located at each side of the handheld device 10, and an additional sensor 18 located at the top of the handheld device 10. Additional embodiments may comprise one or more sensors 18. Furthermore, other embodiments may comprise one or more sensors 18 located at the back, bottom, and/or face of handheld device 10. In addition, the one or more sensors 18 in the various embodiments may have sensing areas of varying sizes and shapes. For example, as shown in FIG. 4, a sensor 18 located at the top of handheld device 10 may have an oval-shaped sensing area that has a larger area than the circular sensing areas of sensors 18 located at the left and right sides of handheld device 10. In sum, the present disclosure contemplates a plurality of embodiments comprising one or more sensors 18, having sensing areas that may vary in area and/or shape, located at each of one or more exterior surfaces of a handheld device 10.

A sensor 18 according to embodiments may be any type of sensor that one of ordinary skill in the art would know to use to detect grasping contact applied to a handheld device 10. In one embodiment, sensor 18 is a pressure sensor. For example, a sensor 18 may be a resistive pressure sensor, a piezoelectric pressure sensor, a strain gauge, or any other type of pressure sensor known in the art. In another embodiment, sensor 18 is a sensor capable of determining the area and/or dimensions of contact. For example sensor 18 may be capacitive sensor or any other type of sensor known in the art to be capable of determining the area and/or dimensions of contact.

Furthermore, one or more sensors 18 may be integrated into a handheld device 10 in any manner known by those of ordinary skill in the art that allows for the detection of a grasping contact applied by a user. For example, a piezoelectric sensor may be internally coupled to a housing of a handheld device 10 such that it can detect slight deformations of the housing that indicate a grasping contact applied to the handheld device 10. In another embodiment, one or more capacitive sensors may be coupled to an exterior surface of the housing of a handheld device 10. In another illustrative embodiment, a sensing pad of a force sensitive resistor may be integrated into the surface of a housing of a handheld device 10 such that a grasping force applied to the handheld device 10 may be directly applied to the sensing pad. In other embodiments, the one or more pressure sensors 18 are coupled to the external surface of the housing of the handheld device 10.

In one embodiment, the handheld device 10 may comprise an accelerometer, a gyroscope, a piezoelectric sensor, or other suitable sensors for detecting acceleration, movement, and/or orientation of the handheld device 10. In one such embodiment, a detected orientation may be used in conjunction with detected pressure to determine a grasping contact applied to handheld device. For example, a handheld device 10 may determine that a horizontally-oriented two-handed grasp is being applied to the handheld device 10 by detecting a horizontal orientation using an accelerometer and detecting pressures indicative of a user grasping the phone at each end (as shown in FIG. 11) using the one or more pressure sensors 18. In other embodiments, orientation is determined based on the pressure detected by the one or more pressure sensors 18.

Illustrative Grasping Contacts

Figure 6:
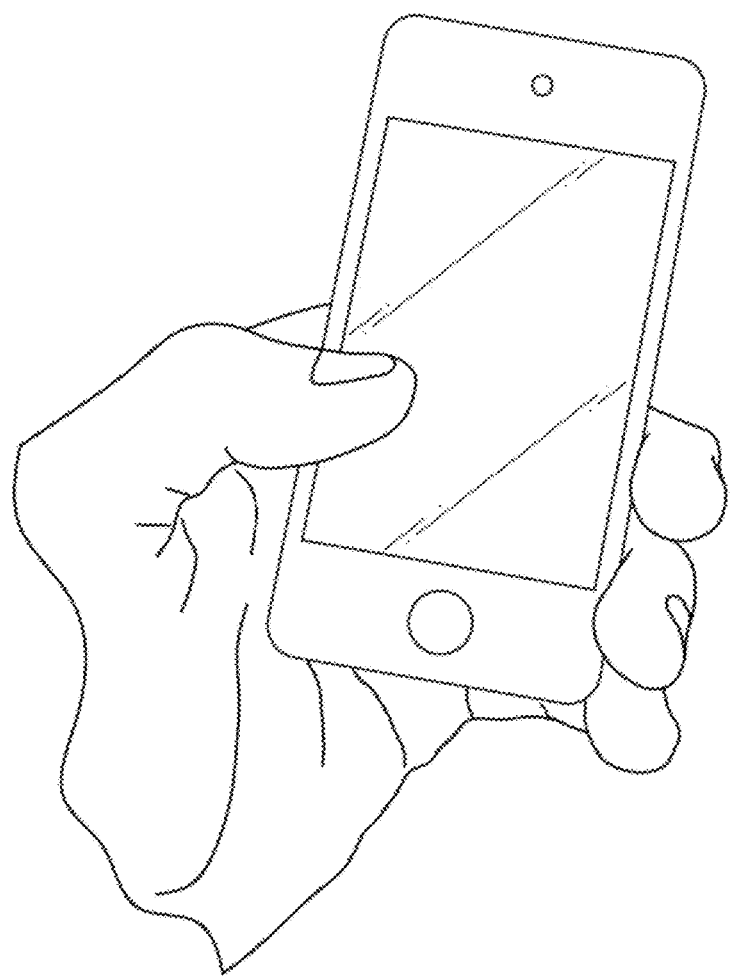
FIGS. 6-14 are illustrative grasping contacts with a handheld device according to embodiments.
Figure 7:
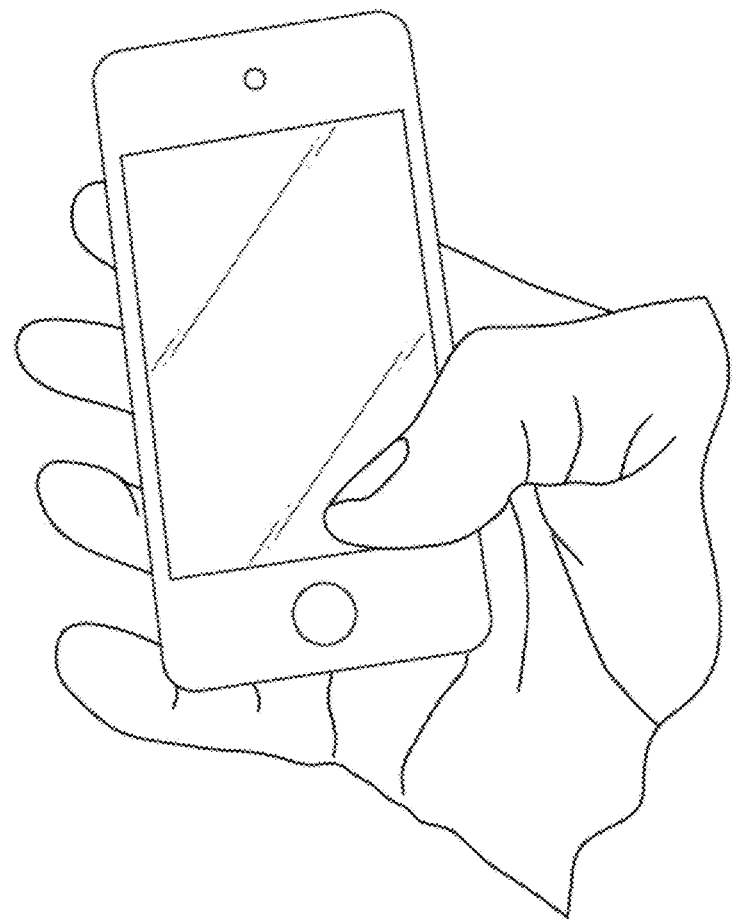
Figure 8:
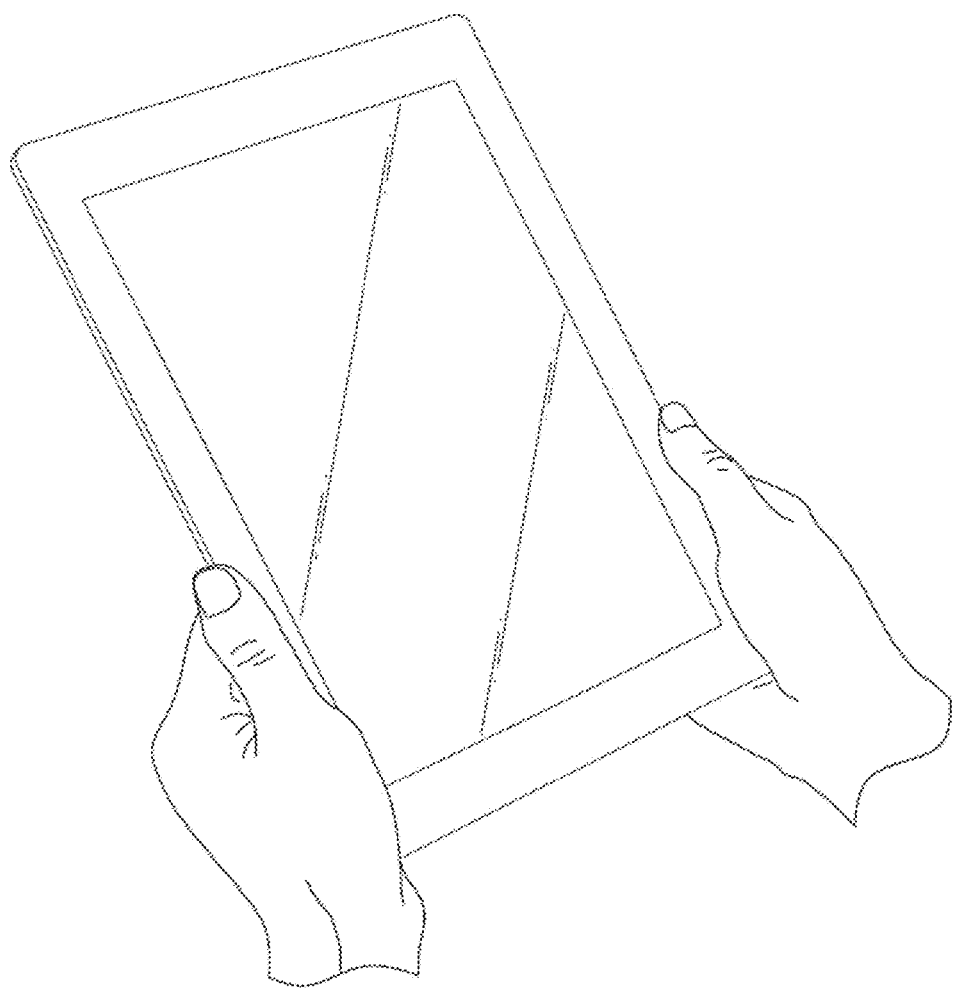
Figure 9:
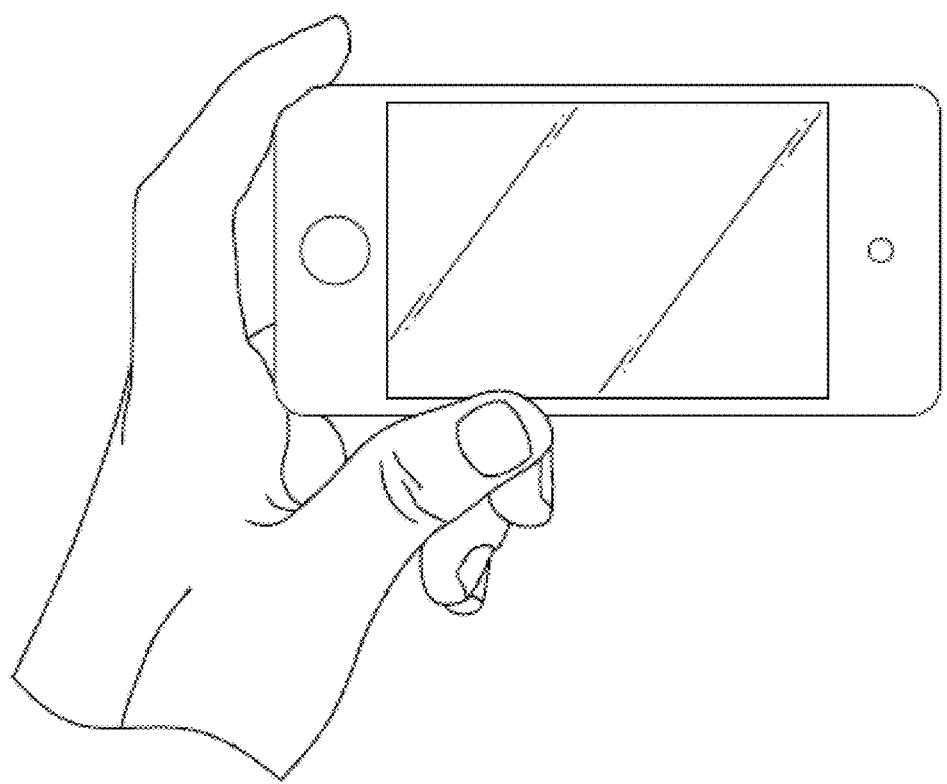
Figure 10:
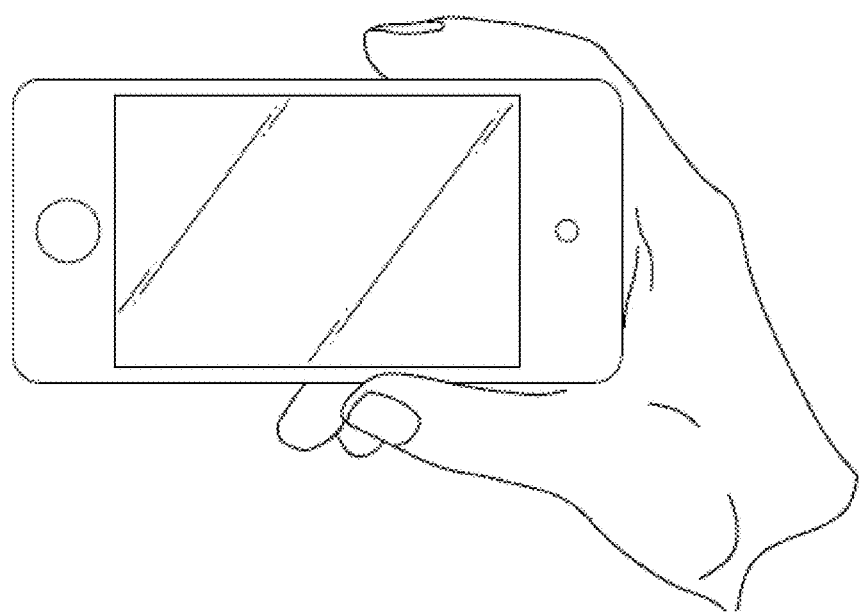
Figure 12:
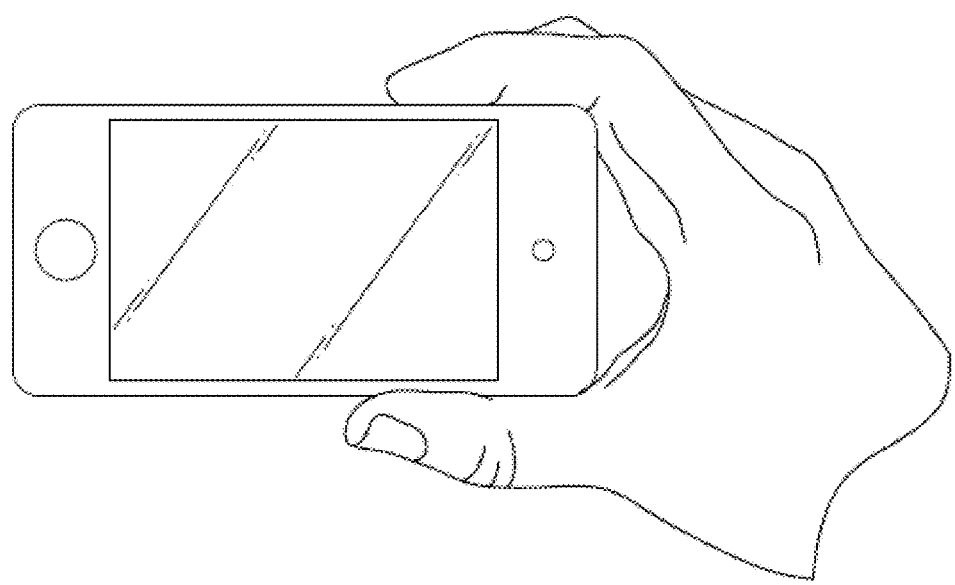
Figure 13:
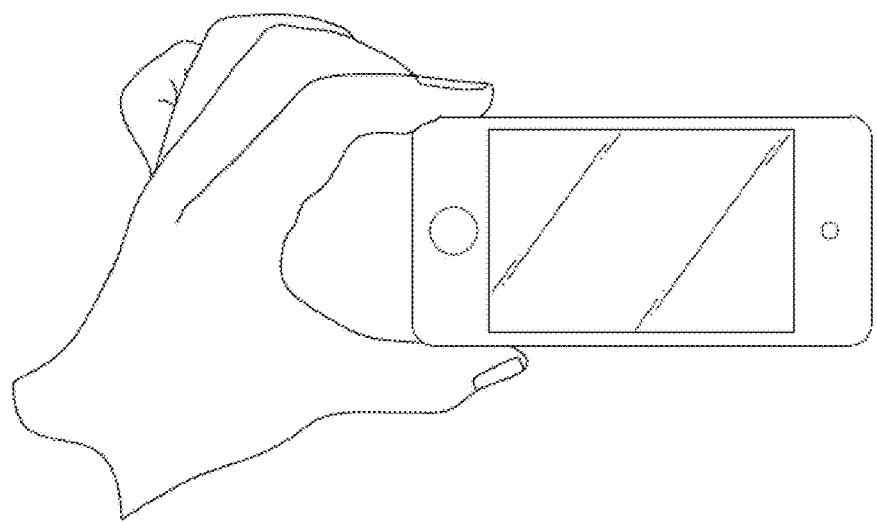
Figure 14:
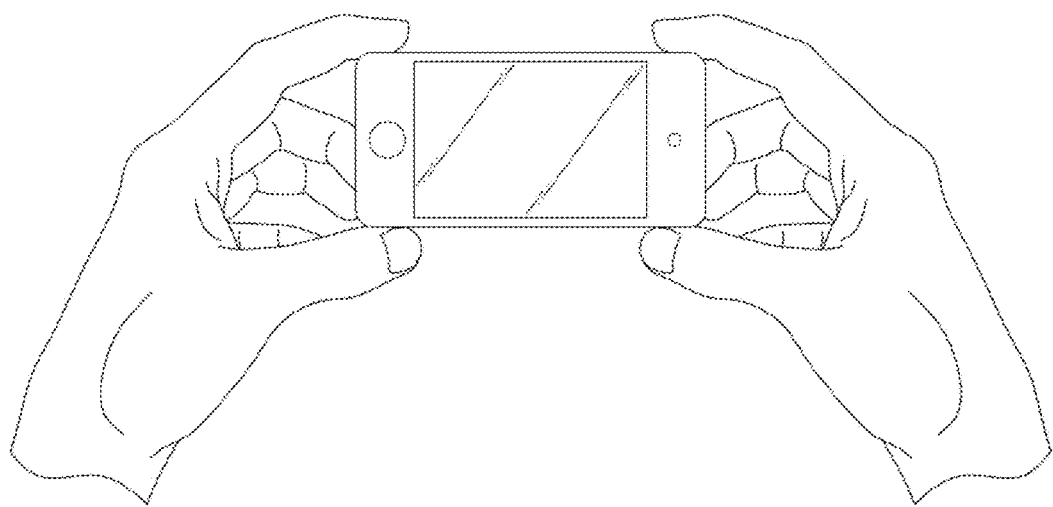

FIGS. 6-14 show illustrative of grasping contacts (also referred to as grasps herein) with a handheld device according to embodiments of the disclosure. In particular, FIG. 6 shows an illustrative vertically-oriented left-handed grasp, FIG. 7 shows an illustrative vertically-oriented right-handed grasp. FIG. 8 shows an illustrative vertically-oriented two-handed grasp. FIG. 9 shows an illustrative horizontally-oriented left-handed grasp. FIG. 10 shows an illustrative horizontally-oriented right-handed grasp. FIG. 11 shows an illustrative horizontally-oriented two-handed grasp. FIG. 12 shows an illustrative right-handed camera grasp. FIG. 13 shows an illustrative left-handed camera grasp. FIG. 14 shows an illustrative two-handed camera grasp. However, the illustrative grasping contacts shown by FIGS. 6-14 are examples and the grasping contacts contemplated by the present disclosure are not limited to these illustrative embodiments. All variations of grasping contacts that a user may use to hold a handheld device are contemplated by the present disclosure.

Operation of an Illustrative Hunt/held Device

Figure 5:
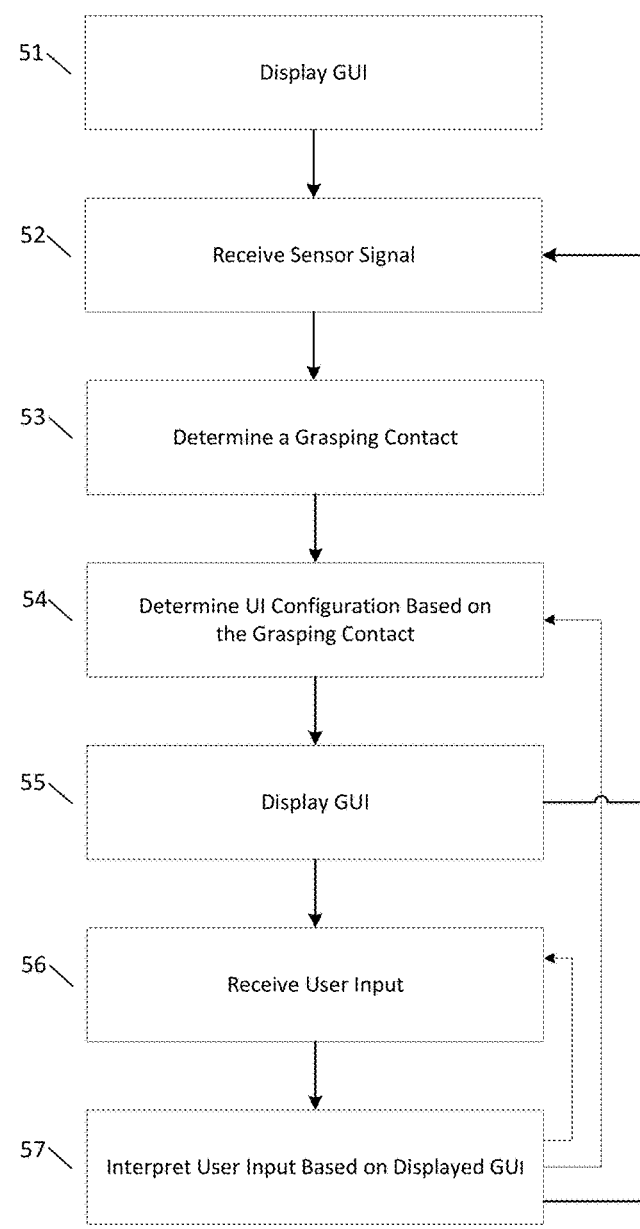
FIG. 5 is a flow diagram illustrating the operation of a handheld device according to one embodiment.

FIG. 5 shows a flow diagram illustrating the operation of a handheld device according to one embodiment. In particular, FIG. 5 shows steps performed by a handheld device to provide GUI configurations based on a user's grasp of the handheld device. To aid in understanding how each of the steps may be performed, the following description is provided in the context of the illustrative block diagram of a handheld device shown in FIG. 1. However, embodiments according to the present disclosure may be implemented in alternative embodiments.

Beginning at step 51, the handheld device 10 displays a GUI according to a first configuration. The first GUI configuration may be any GUI configuration associated with any grasping contact recognizable by the handheld device 10 or the lack of any grasping contact. For example, the handheld device 10 may be displaying a GUI configuration associated with a horizontally-oriented right-handed grasp of the handheld device 10 based on detecting that the handheld device 10 was subjected to such a grasping contact in a previous iteration of the steps 52-56 of FIG. 5. In another example, the handheld device 10 may be displaying a default GUI configuration associated with no grasping contact or an unknown grasping contact.

At step 52, a processor 14 of a handheld device receives a sensor signal indicating a reading obtained by a sensor 18. For example, in one embodiment a handheld device 10 comprises a pressure sensor 18 and the sensor signal received by the processor 14 indicates whether or not the sensor 18 detects pressure applied to the sensor 18 that exceeds a threshold magnitude. In another embodiment, the sensor signal received by the processor 14 indicates a magnitude value of the pressure applied to the sensor 18. In such an embodiment, the sensor signal may indicate a magnitude value of zero where the sensor detects that no pressure is being applied to the sensor. In another embodiment, a sensor 18 does not provide a sensor signal if no pressure is detected. In still another embodiment, handheld device 10 comprises a capacitive sensor 18 and the sensor signal received by processor 14 indicates the area and/or dimensions of contact applied to the sensor 18. In this embodiment, the handheld device 10 may then determine an applied pressure based on the area and/or dimensions of contact applied to the sensor 18.

As described above, a handheld device 10 may comprise a plurality of sensors 18. In one such embodiment, the processor 14 receives signals indicating the pressure or contact area and/or dimensions detected by two or more of the plurality of sensors 18. In other embodiments, sensor signals indicating the pressure or contact area and/or dimensions detected by each of the plurality of sensors 18 are received by the processor 14 of handheld device 10.

In one embodiment, the processor 14 receives sensors signals through periodically checking the output of the one or more sensors 18. In another embodiment, processor 14 checks the output of the one or more sensors 18 upon receiving a hardware interrupt indicating a change in one or sensor readings of sensors 18. In an alternate embodiment, processor 14 checks the output of the one or more sensors 18 upon receiving a software interrupt indicating a change in one or sensor readings of sensors 18.

At step 53, the handheld device 10 processes the one or more sensor signals to determine either a particular grasping contact being applied to the handheld device 10 or that no grasping contact is presently being applied. In one embodiment, processor 14 receives sensor signals corresponding to each of the one or more of the sensors 18 of handheld device 10. In this embodiment, each sensor signal received by the processor 14 indicates that a corresponding sensor 18 either detects the presence (e.g. binary value of 1) or absence (e.g. binary value of 0) of pressure above a required threshold, or a contact. The memory 16 of client device 10 may comprise a set of maps corresponding to possible permutations of the binary values of the sensors 18 that represent grasping contacts. For example, if a client device 10 has four sensors 18, the memory 16 of the client device may comprise the following set of maps: 0000, 0001, 0010, 0011, 0100, 0101, 0110, 0111, 1000, 1001, 1010, 1011, 1100, 1101, 1110, and 1111, wherein each bit represents a particular sensor and each map is associated with a particular grasping contact. In some embodiments, more than one map may correspond to a particular grasping contact. Upon receiving sensor signals corresponding to each sensor 18, the processor 14 may determine a binary value corresponding to each sensor signal, compare the binary values to the set of maps, and thereby determine the appropriate map and corresponding grasping contact.

In another embodiment, processor 14 receives sensor signals corresponding to each sensor 18 of client device 10. Each sensor signal received by the processor 14 indicates a measurement of pressure detected at a corresponding sensor 18. In another embodiment, each sensor signal received by the processor 14 indicates a measurement of contact area and/or dimensions detected at a corresponding sensor 18, whereby the processor 14 calculates corresponding pressure measurements. The range of possible pressure measurements may be subdivided with each subdivision having a corresponding value. The memory 16 of client device 10 may comprise a set of maps corresponding to possible permutations of the subdivided pressure measurement values corresponding to each sensor 18 that represent grasping contacts. For example, if a client device 10 has two sensors 18, and the range pressure magnitudes per sensor is subdivided into four subdivisions, the memory 16 of the client device may comprise the following set of maps: 0000, 0001, 0010, 0011, 0100, 0101, 0110, 0111, 1000, 1001, 1010, 1011, 1100, 1101, 1110, and 1111, wherein the first two bits represent a first sensor 18, the second two bits represent a second sensor 18, and each map is associated with a particular grasping contact. In some embodiments, more than one map may correspond to a particular grasping contact. Upon receiving sensor signals corresponding to each sensor 18, the processor 14 may determine a subdivision value corresponding to each sensor signal, compare the values to the set of maps, and thereby determine the appropriate map and corresponding grasping contact.

In other embodiments, processor 14 receives sensor signals corresponding to a subset of the sensors 18 of a handheld device 10. For example, processor 14 may receive sensor signals from each of the one or more of the sensors 18 of handheld device 10 that are detecting the presence of pressure or contact area and/or dimensions, but not from the sensors 18 to which no pressure, contact, or pressure below a required threshold is applied. In one embodiment, handheld device 10 assumes a default value (e.g., binary value of 0 for no pressure or contact) for the sensors 18 for which the processor 14 did not receive sensor signals, and determines the appropriate map as described above to determine the grasping contact.

In other embodiments, maps using decimal, hexadecimal, or any other types of numbers may be used. In still further embodiments, maps may not be used at all. For example, in one embodiment the processor 14 receives sensor signals indicating measurements of pressure or contact area and/or dimensions for sensors 18 of handheld device 10, and processes the measurements through an algorithm that determines a grasping contact by evaluating measurements for particular sensors 18 relative to measurements for other sensors 18. For example, if a handheld device 10 comprises a sensor 18 at each side of the handheld device 10, detects a pressure applied to the left sensor 18 and a pressure applied to the right sensor 18 that is a magnitude higher than the pressure applied to the left sensor 18, then the handheld device determines that a user is holding handheld device in his left hand. In another embodiment, the algorithm may use both actual and relative measurements to determine the grasping contact. In still another embodiment, the value of pressure measurements over time is used to determine the grasping contact. In another embodiment, the value of pressure measurements over time is used to determine emotions/moods of a user of a handheld device 10.

In addition to detecting grasping contacts, a handheld device 10 may detect the lack of a grasping contact. In one embodiment, a handheld device 10 determines the lack of a grasping contact based all sensors 18 sensing no applied pressure. In another embodiment, the handheld device 10 determines the lack of a grasping contact by determining that the handheld device 10 is lying on a table or similar surface (e.g., by detecting pressure only at sensors 18 located on the back of handheld device 10).

In one embodiment, the operations performed by a handheld device 10 to determine a grasping contact, or lack thereof, applied to handheld device 10 at steps 52 and 53 are performed according to an operating system software module or similar software package stored in memory 16 and comprising software program code executable by processor 14. After determining grasping contact at step 53, the operating system software module would provide grasping contact information to an application layer of the operating system of handheld device 10 so that the application layer may, at step 54, determine a GUI configuration based on the grasping contact. In another embodiment, the grasping contact information is provided to one or more applications executing on handheld device 10, so that the one or more applications may determine a GUI configuration based on the grasping contact, or lack thereof. The grasping contact information may be provided to an application layer and/or one or more applications using an application program interface, a global data structure, messaging between operating system layers, or through any other means known by one having ordinary skill in the art.

At step 54, the handheld device 10 determines a GUI configuration based on the determined grasping contact or the lack of a grasping contact presently applied to a handheld device 10. In one embodiment, memory 16 comprises a database of GUI configurations that may be retrieved according to the grasping contact detected in step 52. In another embodiment, memory 16 comprises a database of GUI configurations that may be retrieved based on a particular grasping contact and on a particular screen displayed when the grasping contact is detected. For example, a handheld device 10 may be displaying a home screen when a vertically-oriented left handed grasp is applied to the handheld device 10. The handheld device 10 retrieves a GUI configuration from the database based on the application of the vertically-oriented left handed grasp and the active status of the home screen. In another embodiment, memory 16 of handheld device 10 comprise program code for applications that may be executed on the handheld device 10, wherein the application program code comprises GUI configurations and a mapping of grasping contacts to the GUI configurations based on the application screen being displayed. For example, a text message composition screen of a texting application may be displayed on a handheld device 10 at the time the handheld device 10 detects the application of a horizontally-oriented two-handed grasp. Based on the grasping contact detected and the active status of the text message composition screen, the texting application determines a GUI configuration based on the mapping of the grasping contacts to GUI configurations while displaying the text message composition screen. In another embodiment, the handheld device 10 determines that an application or particular functionality is to be launched based on the detection of a grasping contact applied to the handheld device 10. For example, a handheld device 10 may be configured to launch a camera application based on a particular grasping contact (e.g. one of the exemplary camera grasps of FIGS. 12-14). The camera application may then determine a particular GUI configuration based on the grasping contact currently applied to the handheld device 10.

In one embodiment, a handheld device 10 determines a GUI configuration based on the determined grasping contact applied to a handheld device 10 and on detected movement or acceleration of the handheld device 10. For example, the handheld device 10 may determine that a user is applying a vertically-oriented left-handed grasp to the handheld device 10 while in a moving vehicle and determine a particular GUI configuration based on the detected movement and grasping contact. In one embodiment, a text messaging application compose screen displays a particular keyboard configuration for a detected vertically-oriented left-handed grasp and no detected movement, but displays no keyboard where the handheld device 10 determines a vertically-oriented left-handed grasp is being applied to a handheld device 10 and also determines that the handheld device 10 is in a moving vehicle.

At step 55, the display 12 of handheld device 10 presents the GUI configuration determined at step 54 based on a detected grasping contact. If the determined GUI configuration is already being displayed, then the handheld device 10 simply continues to display the current GUI configuration. If the GUI configuration determined at step 54 based on a detected grasping contact differs from the GUI configuration currently being displayed, then the handheld device 10 updates the display according to the GUI configuration determined at step 54. In another embodiment, the handheld device 10 launches an application or particular functionality and a corresponding GUI configuration determined at step 54 based on a detected grasping contact, and updates the display 12 based on the determined GUI configuration. If a handheld device 10 receives sensor signals before receiving any user input, the method returns to step 52. If the handheld device receives user input, then the method proceeds to step 56.

For the purposes of this disclosure, user input may be any manipulation of physical controls (e.g. physical buttons, switches, scroll wheels, or any other physical control known to one having ordinary skill in the art) or manipulation of controls or objects displayed on a screen by using one or more fingers, a stylus or similar input mechanisms, to tap, press, press and hold, swipe, or provide any other input through static or dynamic contact with a touchscreen or a touchpad, such as by pressing, dragging or otherwise changing a characteristic of one or more contact points (collectively referred to herein as "gestures"). As discussed below, in some embodiments user input may further comprise grasping contacts and variations of pressure provided by a particular grasping contact. In one embodiment, user input may comprise audio. In another embodiment, user input comprises physically moving the handheld device 10 including shaking, turning, and/or any other physical movements of the handheld device 10 performed by a user.

At step 56, the user interacts with the displayed GUI configuration of the handheld device 10. For example, a user may be using a graphical map application on her handheld device 10 while employing a vertically-oriented right-handed grasp. The mapping application may be configured to use a GUI configuration that displays the map in a vertical orientation and displays the zoom and pan controls for viewing a map on the right side of the display 12 of the handheld device closest to the user's right thumb that may easily access the right side of display 12. Advantageously, the displayed GUI configuration is based on a user's grasp of the handheld device 10 and therefore may be configured provide more convenient GUI than a static GUI that does not change based on the user's grasp or is limited to configuration based on vertical/horizontal orientation.

At step 57, the handheld device interprets the user input based on the displayed GUI configuration. For example, in the mapping application example described above, a user's tap of an area on the right side of the display 12 will be interpreted as a manipulation of a zoom or pan control according to the GUI configuration for a vertically-oriented right-handed grasp. In another embodiment, the user input may cause a screen transition. The subsequent screen may be one of multiple GUI configurations based on a presently applied grasping contact. For example, in the mapping application example described above, if a user presses a button to launch a map search dialogue, the displayed GUI configuration may comprise search dialogue and a keypad along the right side of the display 12 based on a vertically-oriented right-handed grasp.

The method represented by the flow diagram illustrating the operation of a handheld device of FIG. 5 is an iterative process, the steps of which may be performed in different sequences. For example, the process may proceed from displaying a GUI at step 55 to receiving one or more sensor signals at step 52 as a result of a user applying or changing his grasp of handheld device 10. Similarly, the process may interpret user input based on a displayed GUI at step 57 and then proceed to receive one or more sensor signals at step 52 as a result of a user applying or changing his grasp of handheld device 10. Furthermore, as described above, interpretation of user input based on a displayed GUI at step 57 may result in a screen transition. Accordingly, the process may proceed from step 57 to step 54 to determine the appropriate GUI configuration for the screen displayed following the transition. Finally, the process may interpret user input based on a displayed GUI at step 57 and then proceed to receive additional user input at step 56.

Exemplary GUI Configurations

Figure 15A:
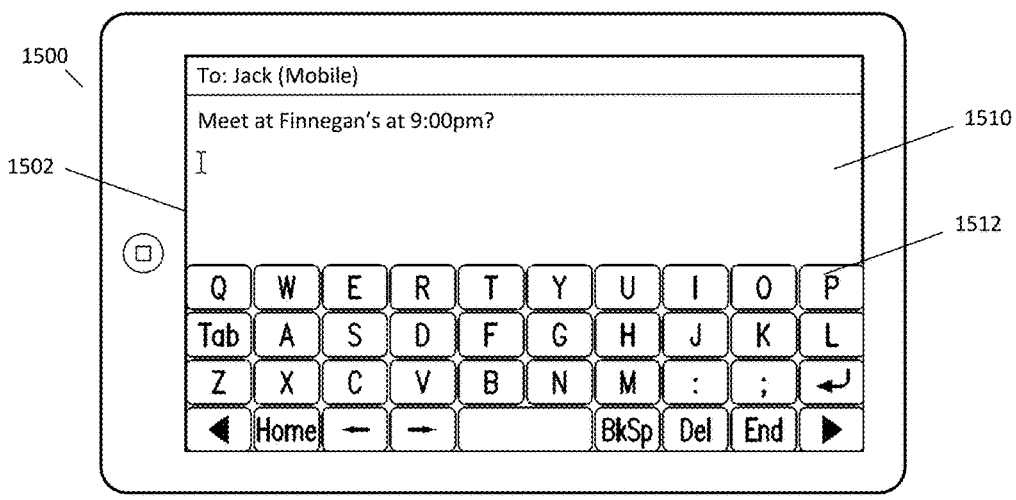
FIGS. 15A-G are illustrations of GUI configurations displayed on a handheld device according to embodiments.

FIGS. 15A-G illustrate GUI configurations according to various embodiments according to the present disclosure FIG. 15A shows a handheld device 1500 displaying a GUI configuration for a text message composition screen when the handheld device 1500 determines that a user is holding the handheld device 1500 in a horizontally-oriented two-handed grasp, such as the grasp illustrated by FIG. 11. Based on the detection of the horizontally-oriented two-handed grasp, the handheld device 1500 determines that a GUI configuration comprising a horizontally-oriented text message composition area 1510 and a keyboard 1512 that spans the bottom portion of a touchscreen 1502 should be displayed. This configuration allows a user to use both thumbs to compose the text message. While composing a text message employing a horizontally-oriented two-handed grasp, the user may change grasps. For example, the user may release his left hand's grasp of the handheld device 1500 resulting in a horizontally-oriented right-handed grasp.

Figure 15B:
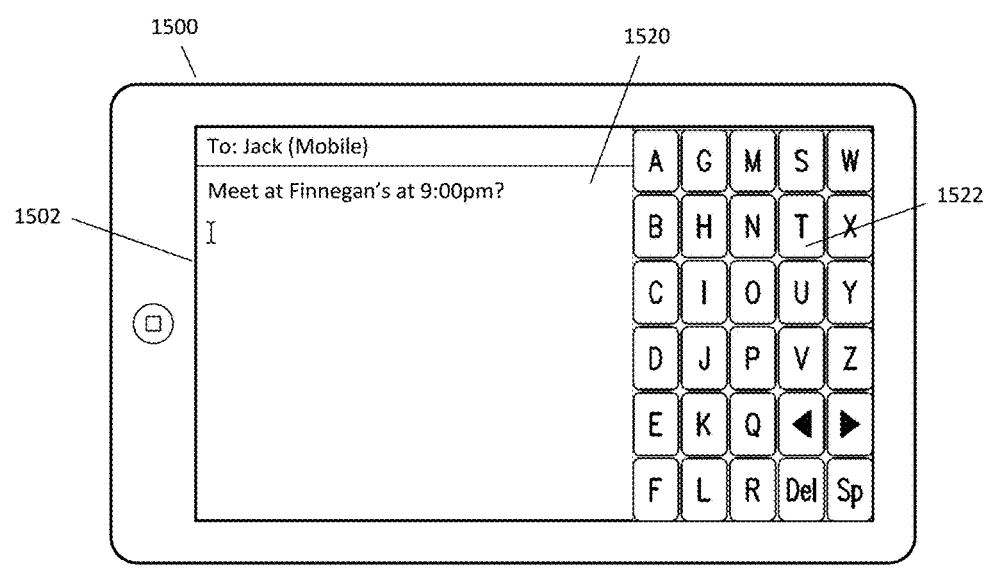

FIG. 15B shows a handheld device 1500 displaying a GUI configuration for a text message composition screen when the handheld device 1500 determines that a user is holding the handheld device 1500 in a horizontally-oriented right-handed grasp, such as the grasp illustrated by FIG. 10. Based on the detection of the horizontally-oriented right-handed grasp, the handheld device 1500 determines that a GUI configuration comprising a horizontally-oriented text message composition area 1520 and a keyboard 1522 positioned on a right portion of the touchscreen 1502 should be displayed. This configuration allows a user to use his right thumb the only thumb positioned near the touchscreen to compose the text message. Therefore, the handheld device 1500 is able to configure the text message composition screen GUI to optimize usability based on the user's grasp. While composing a text message employing a horizontally-oriented right-handed grasp, the user may again change grasps. For example, the user may turn the handheld device 1500 to a vertical position and hold it in his right hand resulting in a vertically-oriented right-handed grasp.

Figure 15C:
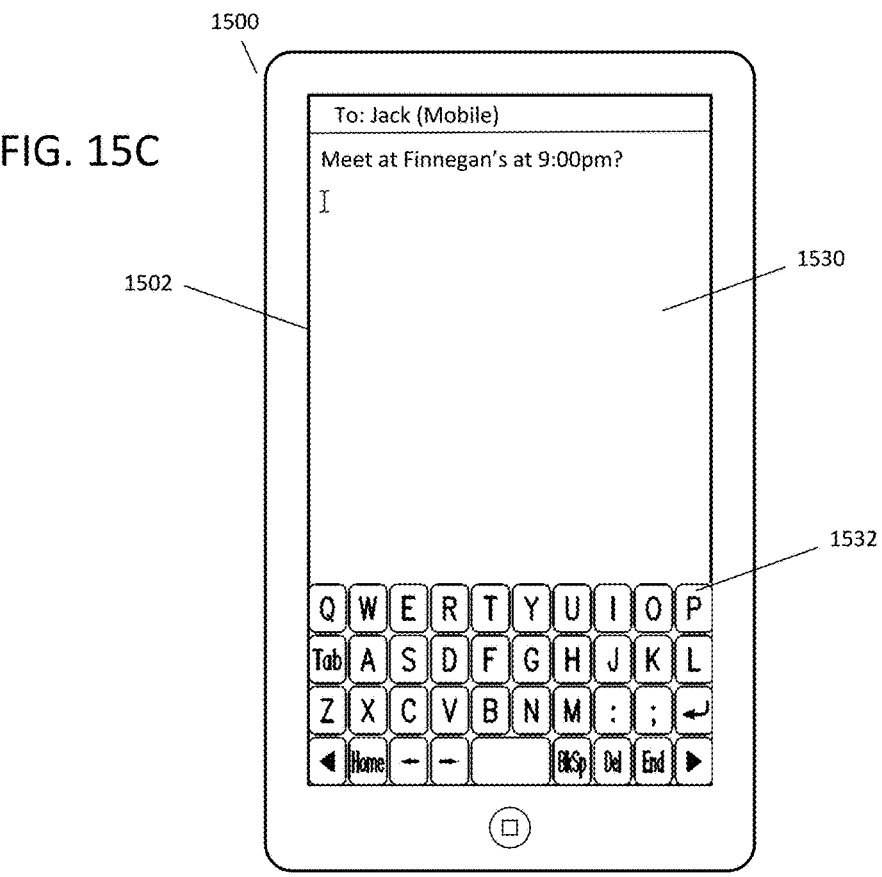

FIG. 15C shows a handheld device 1500 displaying a GUI configuration for a text message composition screen when the handheld device 1500 determines that a user is holding the handheld device 1500 in a vertically-oriented right-handed grasp (see, e.g., FIG. 7), vertically-oriented left-handed grasp (see, e.g., FIG. 6), vertically-oriented two-handed grasp (see, e.g., FIG. 8). Based on the detection of a vertically-oriented right-handed grasp, vertically-oriented left-handed grasp, or vertically-oriented two-handed grasp, the handheld device 1500 determines that a GUI configuration comprising a vertically-oriented text message composition area 1530 and a keyboard 1532 spanning a bottom portion of the touchscreen 1502 should be displayed. In this embodiment, a user's thumb can easily reach the entire width of the display while employing a vertically-oriented right-handed or left-handed grasp. Therefore, a single GUI configuration may be used for a vertically-oriented right-handed grasp, vertically-oriented left-handed grasp, or vertically-oriented two-handed grasp. In other embodiments, different GUI configurations for the text message composition may be used for each of the vertically-oriented grasps. For example, if a touchscreen 1502 of a handheld device 1500 has a width such that a typical user's thumb would not be able to reach the entire width of the touchscreen 1502 while holding the handheld device 1500 in a vertical position, GUI configurations positioning a keypad on appropriate sides of the screen, similar to the illustrative embodiment of FIG. 15B may be employed.

As described above in relation to step 54, in one embodiment a handheld device 1500 may be configured to launch or transition to a different application or functionality not presently displayed upon detecting one or more particular grasping contacts. For example, in one embodiment a user may be composing a text message when she sees an event unfolding, decide that she would like to capture video of the event, and then grasp the phone in a right-handed camera grasp (see, e.g., FIG. 12), a left-handed camera grasp (see, e.g., FIG. 13), or a two-handed camera grasp (see, e.g., FIG. 14) to launch a camera application or transition to camera functionality.

Figure 15D:
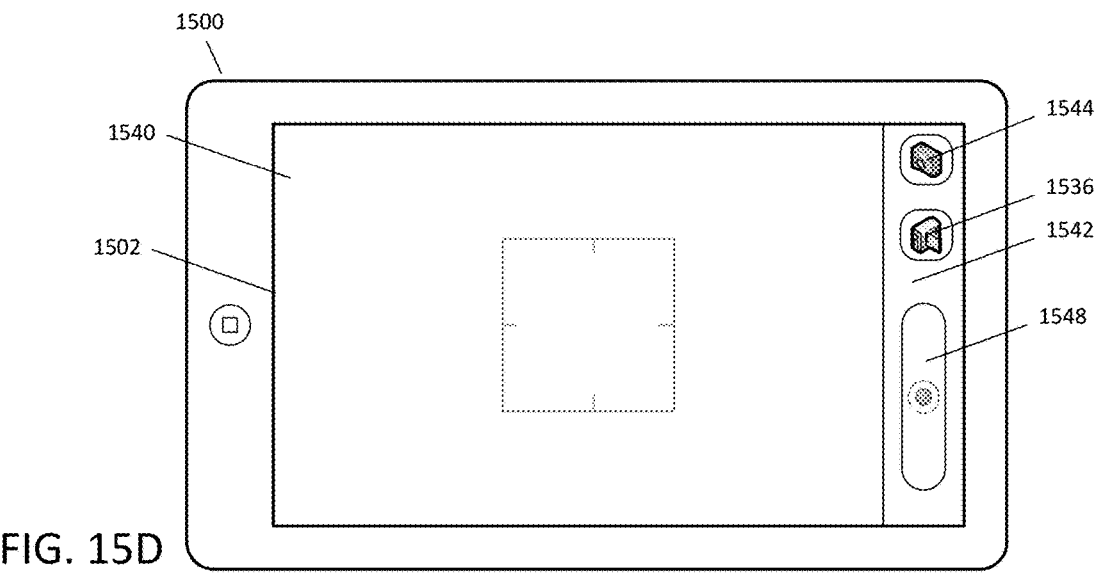

FIG. 15D shows a handheld device 1500 displaying a GUI configuration for a camera screen when the handheld device 1500 determines that a user is holding the handheld device 1500 in a right-handed camera grasp (see, e.g., FIG. 12). Based on the detection of aright-handed camera grasp, the handheld device 1500 determines that a GUI configuration comprising a horizontally-oriented viewfinder area 1540 spanning from the left edge of the touchscreen 1502 to a camera controls area 1542 positioned on the right side of the touchscreen 1502 for displaying user interface controls for manipulating the camera functionality. In the embodiment shown in FIG. 15D, the user interface controls comprise a picture mode button 1544, a video mode button 1546, and a shutter/record button 1548. Additional or alternative controls e.g., zoom controls, timer controls, lighting mode controls, etc.) may be displayed in other embodiments.

Figure 15E:
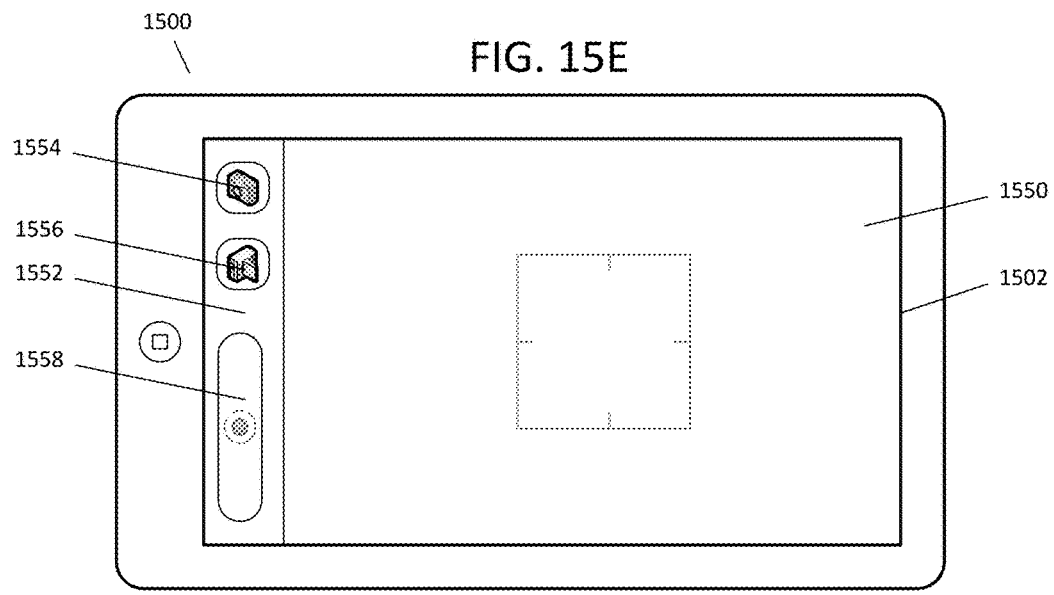

Similarly, FIG. 15E shows a handheld device 1500 displaying a GUI configuration for a camera screen when the handheld device 1500 determines that a user is holding the handheld device 1500 in a left-handed camera grasp (see, e.g., FIG. 13). Based on the detection of a left-handed camera grasp, the handheld device 1500 determines that a GUI configuration comprising a horizontally-oriented viewfinder area 1550 spanning from the right edge of the touchscreen 1502 to a camera controls area 1552 positioned on the left side of the touchscreen 1502 for displaying user interface controls for manipulating the camera functionality. In the embodiment shown in FIG. 15E, the user interface controls comprise a picture mode button 1554, a video mode button 1556, and a shutter/record button 1558. Additional or alternative controls e.g., zoom controls, timer controls, lighting mode controls, etc.) may be displayed in other embodiments.

The configurations of FIGS. 15D and 15E for right-handed camera grasps and left-hand camera grasps, respectively, allow a user to use the thumb positioned near the touchscreen 1502 to control the camera. Therefore, the handheld device 1500 is able to configure the camera screen GUI to optimize usability based on the user's grasp. In another embodiment, the user may apply a two-handed camera grasp (see, e.g., FIG. 14) to the handheld device 1500. In the case of a two-handed camera grasp, both of the user's thumbs would be positioned near the touchscreen 1502. In one embodiment, when a two-handed camera grasp is applied, the handheld device 1500 defaults to the same camera screen GUI configuration used for a left-handed camera grasp. In another embodiment, when a two-handed camera grasp is applied, the handheld device 1500 defaults to the same camera screen GUI configuration used for a right-handed camera grasp. In still another embodiment, when a two-handed camera grasp is applied, the handheld device 1500 will display identical user interface controls (e.g. a picture mode button 1554, a video mode button 1556, and a shutter/record button 1558) on both sides of the touchscreen 1502. In an additional embodiment, when a two-handed camera grasp is applied, the handheld device 1500 displays a camera screen GUI configuration designed for optimal usability with a two-handed camera grasp.

After transitioning to the camera functionality of a handheld device 1500 by applying any one of the three camera grasps described above, a user may decide to rotate the handheld device 1500 to a vertical orientation in order to capture pictures or video in a portrait format. For example, the user may turn the handheld device 1500 to a vertical position and hold it in his right hand resulting in a vertically-oriented right-handed grasp. Alternatively, the user may hold the handheld device in her left hand resulting in a vertically-oriented left-handed grasp.

Figure 15F:
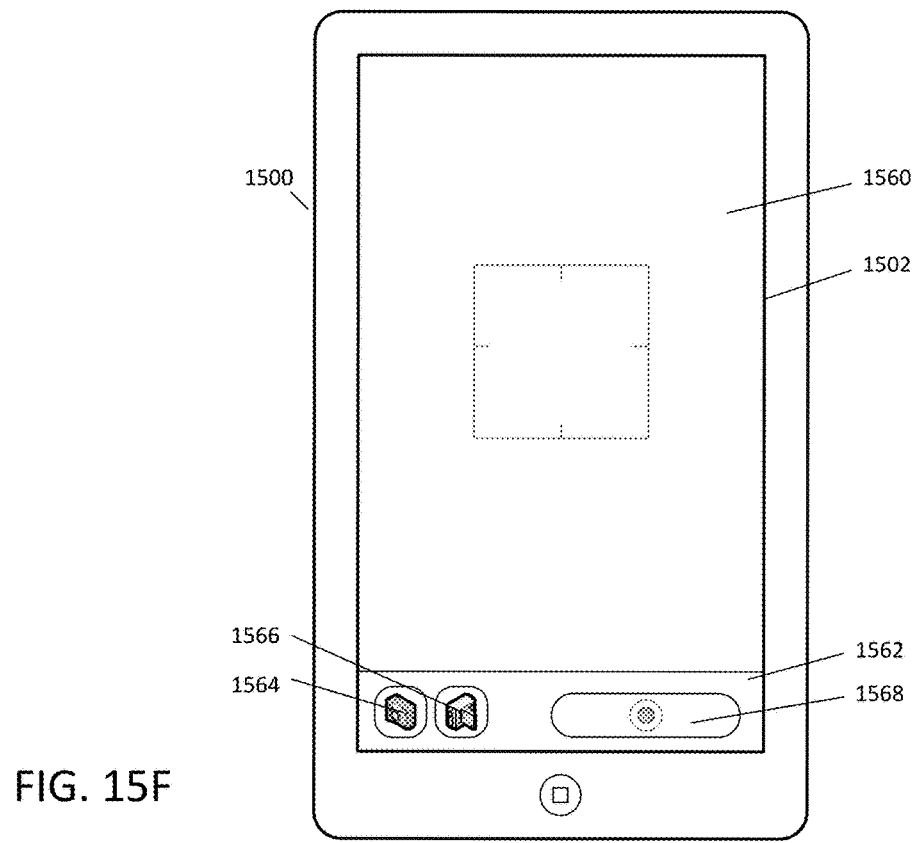

FIG. 15F shows a handheld device 1500 displaying a GUI configuration for a camera screen when the handheld device 1500 determines that a user is holding the handheld device 1500 in a vertically-oriented right-handed grasp with camera functionality active. Based on the detection of a vertically-oriented right-handed grasp, the handheld device 1500 determines that a GUI configuration comprising a vertically-oriented viewfinder area 1560 spanning from the top edge of the touchscreen 1502 to a camera controls area 1562 positioned at the bottom of the touchscreen 1502 for displaying user interface controls for manipulating the camera functionality. In the embodiment shown in FIG. 15F, the user interface controls comprise a picture mode button 1564, a video mode button 1566, and a shutter/record button 11568. The shutter/record button 1568 is positioned toward the right side of the camera controls area 1562 to allow convenient manipulation by a user's right thumb. Additional or alternative controls (e.g., zoom controls, timer controls, lighting mode controls, etc.) may be displayed in other embodiments.

Figure 15G:
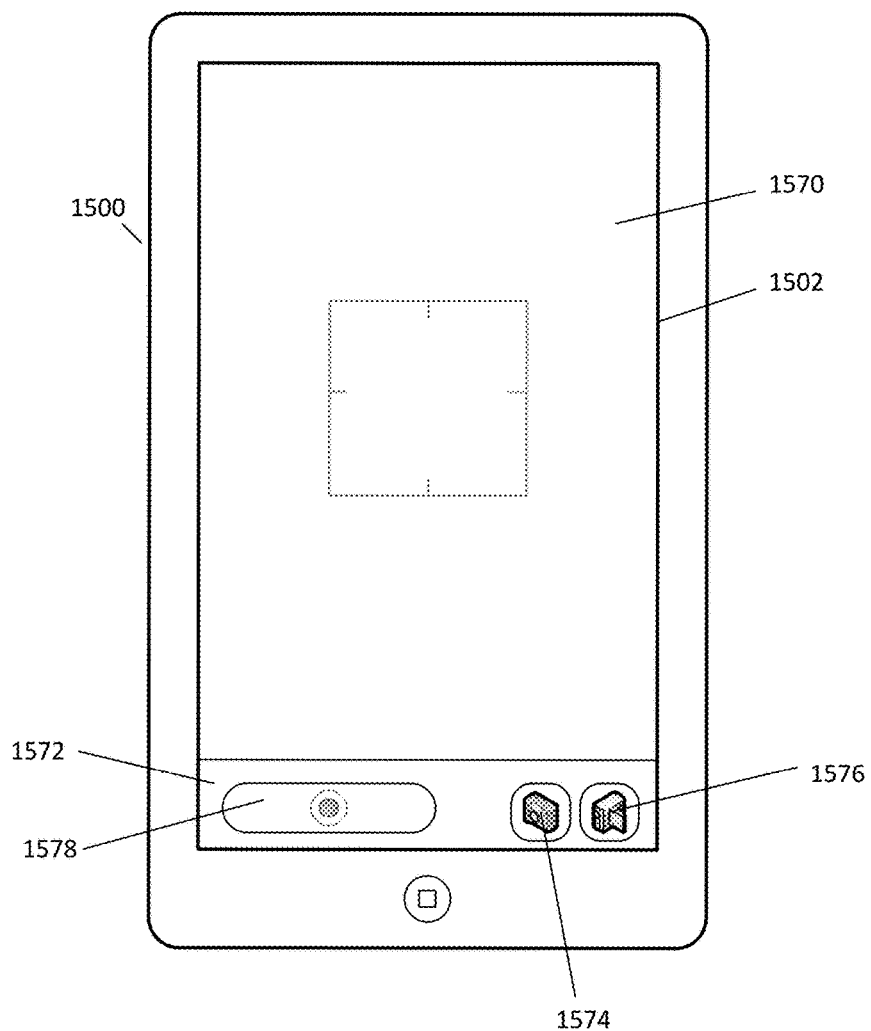

FIG. 15G shows a handheld device 1500 displaying a GUI configuration for a camera screen when the handheld device 1500 deter nines that a user is holding the handheld device 1500 in a vertically-oriented left-handed grasp with camera functionality active. Based on the detection of a vertically-oriented left-handed grasp, the handheld device 1500 determines that a GUI configuration comprising a vertically-oriented viewfinder area 1570 spanning from the top edge of the touchscreen 1502 to a camera controls area 1572 positioned at the bottom of the touchscreen 1502 for displaying user interface controls for manipulating the camera functionality. In the embodiment shown in FIG. 15F, the user interface controls comprise a picture mode button 1574, a video mode button 1576, and a shutter/record button 1578. The shutter/record button 1578 is positioned toward the left side of the camera controls area 1572 to allow convenient manipulation by a user's right thumb. Additional or alternative controls (e.g., zoom controls, timer controls, lighting mode controls, etc.) may be displayed in other embodiments.

In another embodiment, the user may apply a vertically-oriented two-handed grasp to the handheld device 1500 with camera functionality active. In the case of a vertically-oriented two-handed grasp, both of the user's thumbs would be positioned near the touchscreen 1502. In one embodiment, when a vertically-oriented two-handed grasp is applied with camera functionality active, the handheld device 1500 defaults to the same camera screen GUI configuration used for a vertically-oriented left-handed grasp with camera functionality active. In another embodiment, when a vertically-oriented two-handed grasp is applied, the handheld device 1500 defaults to the same camera screen GUI configuration used tier a vertically-oriented right-handed grasp with camera functionality active. In still another embodiment, when a vertically-oriented two-handed grasp is applied, the handheld device 1500 will display identical user interface controls on both sides of the touchscreen 1502. In an additional embodiment, when a vertically-oriented two-handed grasp is applied, the handheld device 1500 displays a camera screen GUI configuration designed for optimal usability with a vertically-oriented two-handed grasp.

Grasping Contacts as User Input

In addition to providing GUI configurations based on grasping contacts applied to a handheld device, the present disclosure further contemplates a handheld device interpreting grasping contacts as user input. In one exemplary embodiment, a user, as she is applying a two-handed camera grasp to a handheld device with her left and right index fingers pressing down on the top corners of the handheld device, may slide either her left or right index finger along the top of the housing of the handheld device toward the middle to cause a camera application to zoom and may slide the finger back to its original position to undo the zoom selection. In another exemplary embodiment, a user, as she is applying a two-handed camera grasp to a handheld device with her left and right index fingers pressing down on the top corners of the handheld device, may increase the pressure applied either index finger to cause a camera application to snap a picture, to begin recording video, change volume, or perform any other operation that according to the design of the camera application. In another exemplary embodiment, particular grasping contacts and related pressure information is used to identify a particular user. In one embodiment, this functionality is used for unlocking a handheld device 10 and/or particular functionality/information contained thereon. For example, a handheld device 10 may provide a phone lock setting that allows the user to input a particular grasp (e.g. pinching the top and bottom of the faces of the handheld device 10 in opposite corners between a user's thumb and index finger, squeezing the sides of the handheld device 10 at particular positions, or any other grasping contact that the handheld device 10 is capable of detecting) to unlock the handheld device. In another embodiment, a handheld device 10 may allow similar configuration and functionality for a keypad lock or for locking applications or particular files containing sensitive information (e.g. a password storage application, a banking application, a contacts application, a notepad application, a file containing confidential strategic information for a business, or any other application or file).

The present disclosure further contemplates embodiments in which a user's emotion or mood is detected based on one more of the particular grasping contacts detected, the magnitude of the pressure applied to a handheld device 10, or the timing of the pressure applied. A handheld device 10 may provide particular GUI configurations and/or tailored functionality based on emotions, moods, or other physiological data detected by one or more sensors. In one embodiment, the haptic effects output by a handheld device 10 may be altered (e.g. lessened/increased in intensity) based on a detected emotion/mood of a user.

In another embodiment, the user ("User A") of one handheld device 10 may input information to the handheld device 10 in the form of grasping contacts and variations of pressure applied by those grasping contacts which, in turn, may be communicated to another handheld device 10 and its user ("User B") thereby providing emotional clues or mood states of User A to User B. In one embodiment, User A's emotion and/or mood is provided to User B through User B's handheld device 10 outputting haptic effects based on emotion and/or mood information received from User A's handheld device 10. In other embodiments, audio and/or visual effects may be used. In one particular embodiment, User A inputs grasping contacts of constant or varying pressures into his/her handheld device 10 that is executing a virtual handshake application that interprets the grasping contacts and causes information based on the grasping contacts to be transmitted to a virtual handshake application executing on User B's handheld device 10. Based on the received information, User B's handheld device outputs one or more haptic effects representing User A's grasping contacts.

The present disclosure contemplates numerous variations of interpreting grasping contacts as user input in relation to any number of applications or functionality including all of the variations that one having ordinary skill in the art would recognize as useful in the process of designing user interfaces for handheld devices.

Haptics

In one embodiment, a handheld device 10 comprises one or more hardware components (e.g. various actuators known to one having ordinary skill in the art) for outputting haptic effects and outputs haptic effects based on grasping contacts detected by a handheld device 10 in one or more of the manners described above. For example, in one embodiment a memory 16 of a handheld device 10 comprises a set or library of haptic effects (e.g. vibrations, pulses, pops, jolts, and/or combinations thereof) associated with various grasping contacts and are output upon detection of a grasping contact as single instances or in repeating patterns for the duration of a detected grasping contact. In another embodiment, the haptic effect will vary in intensity and/or frequency based on variations in the magnitude of pressure applied to a handheld device 10 by a grasping contact and sensed by the handheld device 10. For example, a haptic effect resembling a heartbeat may be output upon detection of a vertically-oriented right-handed grasp and may be strengthened in intensity and/or frequency as a user increases the pressure applied by that grasping contact and may be weakened in intensity and/or frequency as a user lessens the pressure applied by that grasping contact. In one embodiment, a haptic effect (e.g. the heartbeat haptic effect) output by a handheld device 10 may be solely based on the particular grasping contact detected. For example, the handheld device 10 may output a jolt haptic effect upon detecting an upside-down vertically oriented right-handed grasp in order to notify the user that the handheld device 10 is upside-down.

In another embodiment, a handheld device 10 outputs a haptic effect based on a detected grasping contact and the current GUI being displayed and/or the operation being performed by the user of the handheld device 10. For example, a user grasping a handheld device 10 in a vertically-oriented left-handed grasp may activate a scroll list displayed by the handheld device 10 with his/her left thumb flinging the list on the touch screen and simultaneously manipulate the speed of the scrolling by increasing or decreasing the magnitude of the grasping contact applied to the handheld device 10. During the scrolling of the list, the handheld device 10 varies the intensity of the output of haptic effects associated with list scrolling and/or items in the list based on the magnitude of pressure applied by the grasping contact.

The embodiments related to haptics described above are exemplary and do not limit the scope of the present disclosure in any way. The present disclosure contemplates numerous variations of determining and outputting haptic effects based on the nature, variation, and intensity of grasping contacts applied to a handheld device in relation to any number of applications or functionality including all of the variations that one having ordinary skill in the art would recognize as useful in the process of designing user interfaces for handheld devices.

General

While the methods and systems herein are described in terms of software executing on various machines, the methods and systems may also be implemented as specifically-configured hardware, such as a field-programmable gate array (FPGA) specifically to execute the various methods. For example, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PLCs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

We claim:

1. A method comprising:
   detecting, by a computing device, two or more concurrent contacts with the computing device using a plurality of sensors positioned on different sides of the computing device, wherein the two or more concurrent contacts with the computing device form a grasping contact;
   selecting, by the computing device, a bit map that corresponds to the detected two or more concurrent contacts, wherein the bit map is selected from among a plurality of bit maps representative of a plurality of different types of grasping contacts, and wherein each bit in the bit map represents a particular sensor in the plurality of sensors and each bit map of the plurality of bit maps is associated with a particular grasping contact of the plurality of different types of grasping contacts;
   determining, by the computing device, that the selected bit map corresponds to a type of grasping contact among the plurality of different types of grasping contacts;
   determining, by the computing device, a haptic effect based on the type of grasping contact; and
   outputting, by the computing device, the haptic effect.

2. The method of claim 1, wherein the haptic effect is determined based at least in part on a magnitude of a pressure of a contact of the two or more concurrent contacts.

3. The method of claim 1, wherein the grasping contact is determined according to a magnitude of a pressure of a contact of the two or more concurrent contacts and an orientation of the computing device.

4. The method of claim 1, wherein the plurality of sensors are coupled to a housing of the computing device.

5. The method of claim 1, wherein the type of grasping contact includes a vertically-oriented left-handed grasp, a vertically-oriented right-handed grasp, a vertically-oriented two-handed grasp, a horizontally-oriented left-handed grasp, a horizontally-oriented right-handed grasp, or a horizontally-oriented two-handed grasp.

6. A non-transitory computer readable medium comprising software program code executable by a processor of a computing device for causing the computing device to:
   detect two or more concurrent contacts with the computing device using a plurality of sensors positioned on different sides of the computing device, wherein the two or more concurrent contacts with the computing device form a grasping contact;
   select a bit map that corresponds to the detected two or more concurrent contacts, wherein the bit map is selected from among a plurality of bit maps representative of a plurality of different types of grasping contacts, and wherein each bit in the bit map represents a particular sensor in the plurality of sensors and each bit map of the plurality of bit maps is associated with a particular grasping contact of the plurality of different types of grasping contacts;
   determine that the selected bit map corresponds to a type of grasping contact among the plurality of different types of grasping contacts;
   determine a haptic effect based on the type of grasping contact; and
   transmit a haptic signal configured to cause a haptic output device to output the haptic effect.

7. The non-transitory computer readable medium of claim 6, wherein the haptic effect is determined based at least in part on a magnitude of a pressure of a contact of the two or more concurrent contacts.

8. The non-transitory computer readable medium of claim 6, wherein the grasping contact is determined according to a magnitude of a pressure of a contact of the two or more concurrent contacts and an orientation of the computing device.

9. The non-transitory computer readable medium of claim 6, wherein the plurality of sensors are a plurality of pressure sensors coupled to a housing of the computing device.

10. The non-transitory computer readable medium of claim 6, wherein the type of grasping contact includes a vertically-oriented left-handed grasp, a vertically-oriented right-handed grasp, a vertically-oriented two-handed grasp, a horizontally-oriented left-handed grasp, a horizontally-oriented right-handed grasp, or a horizontally-oriented two-handed grasp.

11. A computing device comprising:
 a plurality of sensors positioned on different sides of the computing device and configured to detect a plurality of contacts with the computing device;
 a processor coupled to the plurality of sensors; and
 a memory in communication with the processor, the memory comprising computer program code executable by the processor for causing the processor to:
  detect two or more concurrent contacts with the computing device using the plurality of sensors, wherein the two or more concurrent contacts form a grasping contact;
  select a bit map that corresponds to the detected two or more concurrent contacts, wherein the bit map is selected from among a plurality of bit maps representative of a plurality of different types of grasping contacts, and wherein each bit in the bit map represents a particular sensor in the plurality of sensors and each bit map of the plurality of bit maps is associated with a particular grasping contact of the plurality of different types of grasping contacts;
  determine that the selected bit map corresponds to a type of grasping contact among the plurality of different types of grasping contacts;
  determine a haptic effect based on the type of grasping contact; and
  transmit a haptic signal to a haptic output device configured to cause the haptic output device to output the haptic effect.

12. The computing device of claim 11, further comprising the haptic output device in communication with the processor, and wherein the memory further comprises computer program code executable by the processor for causing the processor to:
 determine the haptic effect based on a magnitude of a pressure of a contact of the two or more concurrent contacts.

13. The computing device of claim 11, wherein the haptic effect is determined according to a magnitude of a pressure of a contact of the two or more concurrent contacts and an orientation of the computing device.

14. The computing device of claim 11, wherein the plurality of sensors include a plurality of pressure sensors coupled to a housing of the computing device.

15. The computing device of claim 11, wherein the type of grasping contact includes a vertically-oriented left-handed grasp, a vertically-oriented right-handed grasp, a vertically-oriented two-handed grasp, a horizontally-oriented left-handed grasp, a horizontally-oriented right-handed grasp, or a horizontally-oriented two-handed grasp.

16. The method of claim 1, wherein the haptic effect is determined by correlating the type of grasping contact to the haptic effect in a library of haptic effects.

17. The method of claim 1, wherein the plurality of different types of grasping contacts includes all of a vertically-oriented left-handed grasp, a vertically-oriented right-handed grasp, a vertically-oriented two-handed grasp, a horizontally-oriented left-handed grasp, a horizontally-oriented right-handed grasp, and a horizontally-oriented two-handed grasp.

18. The method of claim 1, further comprising:
 determining a mood of a user based on the grasping contact; and
 configuring a graphical user interface (GUI) based at least in part on the mood.

19. The method of claim 18, further comprising altering the haptic effect based at least in part on the mood.

20. The method of claim 1, wherein the haptic effect is determined based on the type of grasping contact.

21. The method of claim 20, wherein the haptic effect is configured to identify the type of grasping contact.

22. The method of claim 1, wherein the haptic effect is determined based on an orientation of the type of grasping contact.

23. The method of claim 22, wherein the haptic effect is configured to indicate the orientation of the type of grasping contact.

* * * * *

UNITED STATES PATENT AND TRADEMARK OFFICE
CERTIFICATE OF CORRECTION

| | | |
|---|---|---|
| PATENT NO. | : 9,904,394 B2 | Page 1 of 1 |
| APPLICATION NO. | : 13/800264 | |
| DATED | : February 27, 2018 | |
| INVENTOR(S) | : Juan Manuel Cruz-Hernandez | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 161 days.

Signed and Sealed this
Fifth Day of February, 2019

Andrei Iancu
*Director of the United States Patent and Trademark Office*